United States Patent [19]

Yoshida et al.

[11] Patent Number: 5,193,156
[45] Date of Patent: Mar. 9, 1993

[54] DATA PROCESSOR WITH PIPELINE WHICH DISABLES EXCEPTION PROCESSING FOR NON-TAKEN BRANCHES

[75] Inventors: Toyohiko Yoshida; Masahito Matuo, both of Itami, Japan

[73] Assignee: Mitsubishi Denki Kabushiki Kaisha, Tokyo, Japan

[21] Appl. No.: 312,554

[22] Filed: Feb. 17, 1989

[30] Foreign Application Priority Data

Feb. 23, 1988 [JP] Japan .................................. 63-40026

[51] Int. Cl.$^5$ .............................................. G06F 9/38
[52] U.S. Cl. ........................... 395/375; 364/DIG. 1; 364/231.8; 364/261.3; 364/261.9; 395/800
[58] Field of Search ................... 364/DIG. 1, DIG. 2; 395/375, 800

[56] References Cited

U.S. PATENT DOCUMENTS 4,435,756 3/1984 Potush ................................ 395/375
4,477,872 10/1984 Losq et al. ........................ 364/200

OTHER PUBLICATIONS

"Branch Prediction Strategies and Branch Target Buffer Design," Lee, et al, *Computer*, vol. 17, No. 1, Jan. 1984.

"Reducing the Cost of Branches," McFarling, et al, The 13th Annual International Symposium on Computer Architecture, Jun. '86.

*Primary Examiner*—Robert B. Harrell
*Attorney, Agent, or Firm*—Townsend and Townsend

[57] ABSTRACT

The data processor of this invention is provided with a multi-stage pipeline processing mechanism which predicts the probability of the branch instruction branching at the instruction decoding stage. The mechanism also detects exceptions at pre-branching and transmits information about a detected exception to the instruction execution stage. If, at the execution stage, it is determined that the branch prediction was incorrect, exception processing is not started. If, at the execution stage, it is determined that the branch prediction was correct, exception processing is started. In this way it is possible to reduce disturbances in pipeline processing for many branch instructions.

6 Claims, 17 Drawing Sheets (SERIAL BIT NUMBER)

```
0        7 8       15 16      23 24      31
```

(BIT NUMBER IN EACH BYTE)

```
    N          N+1        N+2         N+3
```

(ADDRESS)

←LOW ADDRESS        HIGH ADDRESS→
←MSB SIDE             LSB SIDE→

→→DIRECTION OF READ INSTRUCTION→→

| INSTRUCTION | ADDRESSING EXTENTION |
|---|---|
| BASIC PORTION | PART |
| (2 BYTE) | (0~4 BYTE) |

×1~3 TIMES

| INSTRUCTION | (CHAINED ADDRESSING MODE+ADDRESSING |
|---|---|
| BASIC PORTION | EXTENTION PART)XnTIMES |
| (2 BYTE) | ((2 BYTE+0~4 BYTE)Xn) |

×1~3 TIMES

BASIC INSTRUCTION FORMAT OF DATA
PROCESSOR OF THIS INVENTION

DATA PROCESSOR WITH PIPELINE WHICH DISABLES EXCEPTION PROCESSING FOR NON-TAKEN BRANCHES

BACKGROUND OF THE INVENTION

1. Field of the Invention

This invention relates to a data processor having a branch instructions processing mechanism capable of suppressing disturbances in the pipeline processing and suppressing starting of unnecessary exception processing, thereby providing high processing capability by means of effective operation of a multistage pipeline processing mechanism.

2. Description of the Prior Art

FIG. 1 is an example of a schematic diagram of a pipeline processing mechanism used for a conventional data processor.

Reference numerals in the figure designate the following elements: 11, instruction fetch stage (IF stage); 12, instruction decoding stage (D stage); 13, operand address calculation stage (A stage); 14, operand fetch stage (F stage); and 15, instruction execution stage (E stage).

The IF stage 11 fetches instruction code from a memory and outputs it to the D stage 12. The D stage 12 decodes the instruction code received from the IF stage 11 and outputs a decoding result to the A stage 13.

The A stage 13 calculates an effective address of an operand designated in the instruction code, and then outputs the calculated operand address to the F stage 14. In accordance with the operand address delivered from the A stage 13, the F stage 14 fetches an operand from memory. The fetched operand is delivered to the E stage 15. The E stage 15 executes arithmetical operation designated by the instruction code for the operand delivered from the F stage 14. It also stores the result of arithmetical operation in memory as required.

The pipeline processing mechanism mentioned above divides the processings designated by each instruction into five stages. By sequentially executing the five-step processings, all the designated processing are completed. Each of five processings can be implemented in parallel with each other against different instructions. Ideally, compared to the case where no pipeline processing is executed, the five-stage pipeline processing mechanism mentioned above simultaneously processes five instructions so that an efficient data processor having a maximum of 5-times data processing capability can be provided.

As mentioned above, the pipeline processing mechanism has a possibility of greatly promoting the data processing capability of data processors, and thus, is widely made available for achieving high-speed data processing operation.

Nevertheless, even the pipeline processing mechanism still has problems to solve. Actually, instructions are not always processed in ideal conditions. One of these critical problems is the method of executing branch instruction which easily disturbs the sequence of instructions.

The conventional data processor having the pipeline processing mechanism shown in FIG. 1 causes the pipeline to be disturbed significantly when executing branch instructions by allowing the IF stage 11 to fetch the branch target instruction.

FIG. 2 shows the state of instruction flows through pipeline when branch instructions are executed in the conventional data processor. In FIG. 2, instructions IN 3 and IN 12 are branch instructions. When instruction IN 3 is executed, whole instructions IN 4 through IN 7 under pipeline processing operation are canceled, and as a result, the IF stage 11 starts to process instruction IN 11. If this occurs, time sufficient to process four instructions is wasted in the period from the execution of the instruction IN 3 via the E stage 15 to the execution of the instruction IN 11 by the E stage 15. Likewise, time sufficient to process four instructions is wasted before executing the instruction IN 12. Only after completing all the pipeline processings for branch instruction, fetching of and instruction to be processed after execution of branch instruction is executed by any conventional data processor, thus eventually resulting in the wasted time. The more the number of pipeline processing stages, the more the time being wasted.

It has been pointed out many times that the processing of branch instructions is a key point in improving the processing capacity of a data processor which performs pipeline processing, and various approaches have been attempted in this regard.

An example of branch instructions processing methods is reported in J. K. F. Lee, A. J. Smith, "Branch Prediction Strategies and Branch Target Buffer Design", IEEE Computer, Vol. 17, No. 1, January, 1984. However, any of these proposed methods has drawbacks such as the requirement for a large hardware construction and validity restricted only to a part of the branch instructions.

Especially, a data processor which correctly processes exceptions generated during processing of branch instructions, and can execute high efficiency branching processing is not known.

SUMMARY OF THE INVENTION

This invention has been made in such circumstances as mentioned above, and is intended to provide a data processor which correctly processes exceptions generated during branching processing to prevent reduction of date processing speed.

The data processor of the present invention is provided with means for transmitting information relating to an exception which is detected during branching processing at the instruction decoding stage, that is, during pre-branching processing, and an instruction execution stage which does not start exception processing for exception by branching processing corresponding to incorrect branch prediction, and starts exception processing for exception by branching processing corresponding to correct branch prediction.

By means of the above-mentioned features, the exception which detected at pre-branching in the instruction detection decoding stage is held until the instruction which generates the exception is processed at the instruction execution stage, and information which is detected at the time and related to the exception is transmitted to the instruction detected stage, so that exception processing with respect to the exception to be detected by correct branching processing is started.

The above and further objects and features of the invention will more fully be apparent from the following detailed description with accompanying drawings.

DESCRIPTION OF THE PREFERRED EMBODIMENTS

Hereinafter, detailed description is made on the present invention based on drawings showing one embodiment thereof.

(1) "Instruction Format of Data Processor of the Present Invention"

An instruction of a data processor of the present invention is formed on a 16-bit unit basis, being variable in length, and no instruction of odd bytes is used herein.

The data processor of the present invention has an instruction format system specifically devised for the purpose of writing a highly frequent instruction in a short format. For example, as to a two-operand instruction, two formats are provided; a great-type format which has basically a configuration of "four bytes+extension part(s)" and allows the utilization of all addressing modes and a reduced-type format allowing only the use of a highly frequent instruction and an addressing mode.

The meaning of symbols appearing in the instruction format of the data processor of the present invention shown in FIG. 3 to FIG. 12 are as follows:

—: Portion wherein operation code is put.

\#: Portion wherein literal or immediate value is put.

Ea: Portion for generating an operand in a general-type 8-bit addressing mode.

Sh: Portion for designating an operand in a reduced-type 6-bit addressing mode.

Rn: Portion for designating an operand in a register by the register number.

Figure 3:
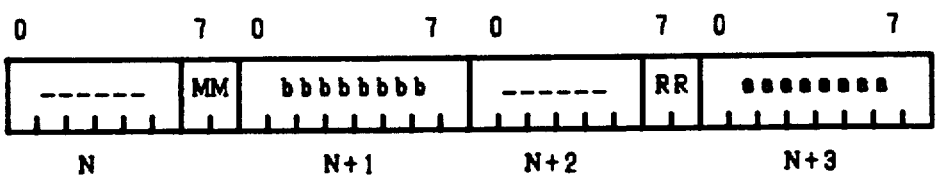
FIG. 3 is a schematic diagram showing a typical form of an instruction format of a data processor in accordance with the present invention.

In the format, as shown in FIG. 3, the right side is the LSB side and is high address. The instruction format can be discriminated only after an address N and an address N+1 are checked, and as described above, this is because of a premise that the instruction is fetched and decoded on a 16-bit (2-byte) unit basis without fail.

In the data processor of the present invention, in the case with any format, the extension part of Ea or Sh of each operand is sure to be positioned immediately after a half word comprising the basic part of that Ea or Sh. This takes precedence over the immediate vale data specified implicitly by the instruction or the extension part of the instruction. Accordingly, as to an instruction of four or more bytes, there are cases where the operation code of the instruction is divided by the extension part of Ea.

Also, as described later, where another extension part is further attached to the extension part of Ea by a chained address mode, this part takes precedence over the next instruction. For example, consideration is made on the case of 6-byte instruction which comprises Ea1 in a first half word, Ea2 in a second half word, and ends with a third half word. Since the chained address mode is used for Ea1, another extension part of the chained address mode is assumed to be attached in addition to the ordinary extension part, and then the actual instruction bit pattern is composed in the sequence of the first word of instruction (including the basic part of Ea1), the expansion part of Ea1, the chained address mode extension part, the second half word of instruction (including the basic part of Ea2), the expansion part of Ea1 and the third half word of instruction.

In addition, detailed description of contents of the instruction formats above-mentioned are described in "The Method of Allocation of the Instruction Bits for the TRON Specification Chip", by K. Sakamura, Documents of the Third Real Time Architecture TRON Seminar, Japanese Electronic Information Community Society.

(1.1) "Reduced-Type Two-Operand Instruction"

FIG. 4 through FIG. 7 are schematic diagrams showing reduced-type formats of the two-operand instruction.

Figure 4:
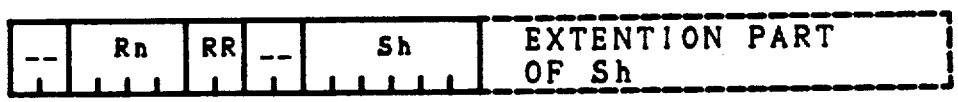
FIG. 4 is a schematic diagram showing a reduced-type format of an operational instruction between memory and register.

FIG. 4 is a schematic diagram showing a format of an operational instruction between memory and register. This format includes a L-format wherein the source operand side is a memory and a S-format wherein the destination operand side is a memory.

In the L-format, Sh represents the designating field of the source operand, Rn represents the designating field of the register of the destination operand and RR represents designating of the operand size of Sh, respectively. The size of the destination operand located in the register is fixed to 32 bits. Where the size of the register side differs from that of the memory side and the size of the source side is smaller, sign extension is performed.

In the S-format, Sh represents the designating field of the destination operand, Rn represents the register designating field of the source operand and RR represents designating of the operand size of Sh, respectively. The size of the source operand located in the register is fixed to 32 bits. Where the size of the register side differs from that of the memory side and size of the source side is larger, truncating of the overflow portion and overflow check are performed.

Figure 5:
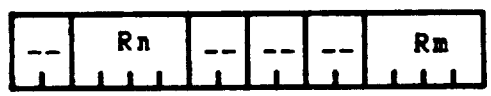
FIG. 5 is a schematic diagram showing a reduced-type format of an operational instruction between register and register.

FIG. 5 is a schematic diagram showing a format of an operational instruction between register and register (R-format). Rn represents the designating field of the destination register, and Rm represents the designating field of the source register. The operand size is 32 bits only.

Figure 6:
FIG. 6 is a schematic diagram showing a reduced-type format of an operational instruction between literal and memory.

FIG. 6 is a schematic diagram showing a format of an operational instruction between literal and memory (Q-format). MM shows the designating field of the destination operand size, ### shows the designating field of the source operand by literal, and Sh shows the designating field of the destination operand.

Figure 7:
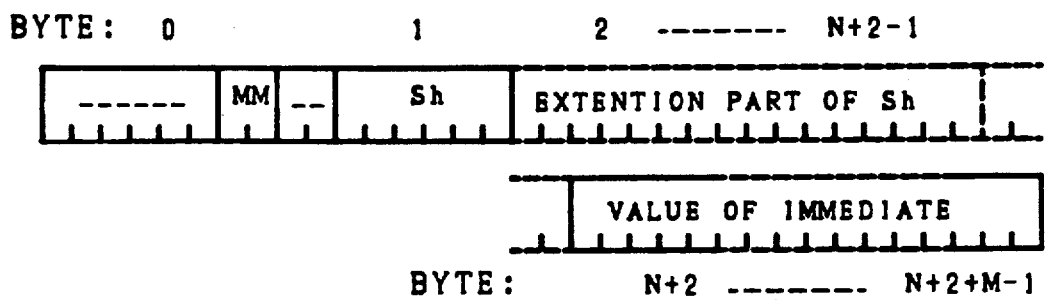
FIG. 7 is a schematic diagram showing a reduced-type format of an operational instruction between immediate value and memory.

FIG. 7 is a schematic diagram showing a format of an operational instruction between immediate value and memory (I-format). MM represents the designating field of the operand size (common in source and destination), and Sh represents the designating field of the destination operand. The sizes of the immediate value of the I-format are 8, 16 and 32 bits in common with the sizes of the operand of the destination side, and zero extension and sign extension are not performed.

(1.2) "General-Type One-Operand Instruction"

Figure 8:
FIG. 8 is a schematic diagram showing a general-type format of a one-operand instruction.

FIG. 8 is a schematic diagram showing a general-type format of one-operand instruction (G1-format). MM represents the designating field of the operand size. Some of the G1-format instructions comprise an extension part besides the extension part of Ea. There are also instructions using no MM.

(1.3) "General-Type Two-Operand Instruction"

Figure 9:
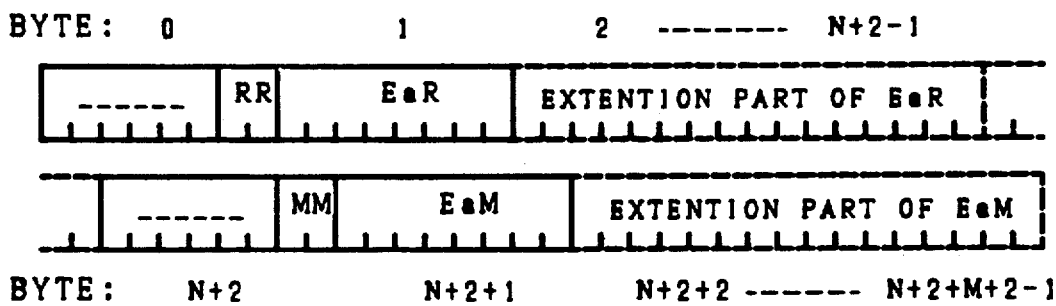
FIG. 9 is a schematic diagram showing a general-type format of a two-operand instruction wherein a first operand instruction necessitates memory read-out.
Figure 10:
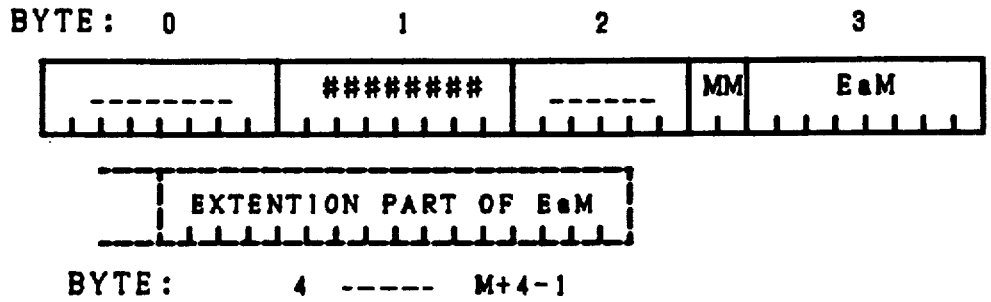
FIG. 10 is a schematic diagram showing a general-type format of a two-operand instruction wherein a first operand is an eight-bit immediate value.
Figure 11:
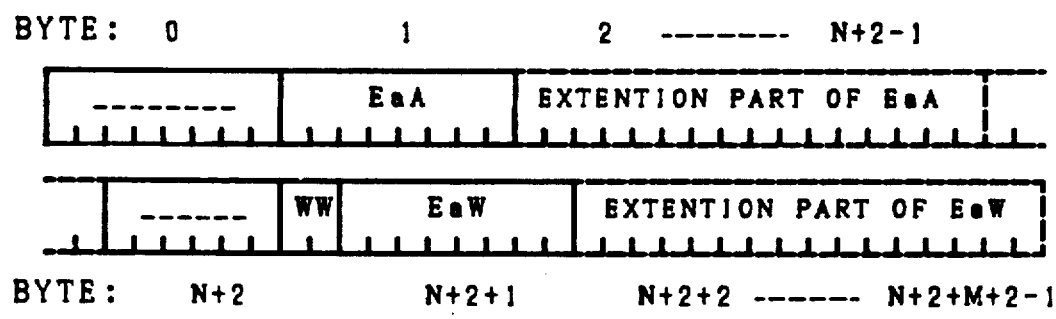
FIG. 11 is a schematic diagram showing a general-type format of a two-operand instruction wherein a first operand is only address calculation.

FIG. 9 through FIG. 11 are schematic diagrams showing general-type formats of two-operand instruction. This format comprises an instruction having a maximum of two operands of the general-type addressing mode which are designated by eight bits. There are cases where the total number itself of operands becomes three or more.

FIG. 9 is a schematic diagram showing a format of an instruction wherein a first operand necessitates memory read-out (G-format). EaM represents the designating field of the destination operand, MM represents the designating field of the destination operand size, EaR represents the designating field of the source operand, and RR represents the designating field of the source operand size. Some of the G-format instructions comprise an extension part besides the extension part of EaR.

FIG. 10 is a schematic diagram showing a format of an instruction wherein a first operand is an instruction of eight-bit immediate value (E-format). EaM represents the designating field of the destination operand, MM represents the designating field of the destination operand size, and ## ... represents the source operand value.

The E-format and the I-format have similar functions, but their conceptions greatly differ from each other. Specifically, the E-format is coherently of a type derived from the general type of two-operand (G-format), the size of source operand is eight-bits fixed, and the size of destination operand is selected from among 8, 16 and 32 bits. This means that the E-format presupposes operation between different sizes, and the source operand of eight bits is zero-extended or code-extended in a manner of agreeing with the size of the destination operand. On the other hand, the I-format is of a type that the patterns of immediate value having high frequency particularly in the transfer instruction and the comparison instruction are shortened, and the sizes of the source operand and the destination operand are equal.

FIG. 11 is a schematic diagram showing a format of an instruction wherein a first operand is only address calculation. EaW represents the designating field of the destination operand, WW represents the designating field of the destination operand size, and EaA represents the designating field of the source operand. For the source operand, the calculation result itself of executed address is used.

Figure 12:
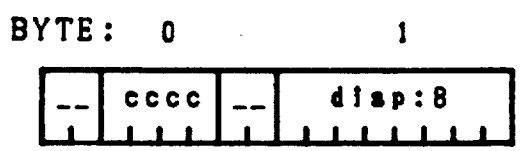
FIG. 12 is a schematic diagram showing an instruction format of short branch.

FIG. 12 is a schematic diagram showing a format of a short branch instruction. Symbol cccc represents the designating field of branch condition, dips:8 represents the designating filed of displacement to a jump destination, and in the data processor of the present invention, when displacement is designated by eighth bits, the displacement value is set by doubling the designated value in the bit pattern.

(1.4) "Addressing Mode"

The method of designating the addressing mode of the data processor of the present invention include the reduced type designated by six bits including the register and the general type designating by eight bits.

Where an undefined addressing mode has been designated, or where a combination of addressing modes obviously unsuitable in the meaning has been designated, a reserved instruction exception is generated likewise the case where the undefined instruction has been executed, and exception processing is started.

Equivalents to the above include the case where the destination is the immediate value mode and the case where the immediate value mode is used in the designating field of the addressing mode to be accompanied by address calculation.

Meanings of symbols used in the format diagram shown in FIG. 13 to FIG. 23 is as follows:

Rn: Register designating mem [EA]: Memory content of address as shown by EA (Sh): Designating method by the reduced-type addressing mode of six bits (Ea): Designating method by the general-type addressing mode of eight bits In the format diagram, the portion surrounded by a broken line shows the extension part.

(1.4.1)1 ) "Basic Addressing Modes"

The data processor of the present invention supports various addressing modes. Among them, the basic addressing modes supported by the data processor of the present invention include a register direct mode, a register indirect mode, a register relative indirect mode, an immediate value mode, an absolute mode, a PC (Program Counter) relative indirect mode, a stack pop mode and a stack push mode.

Figure 13:
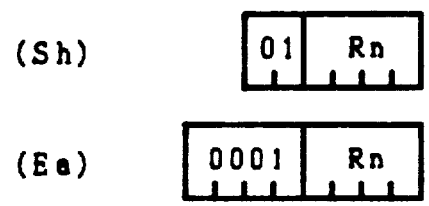
FIG. 13 is a schematic diagram showing a format wherein an addressing mode designating part is of a register direct mode.

The register direct mode takes the content of register intact as an operand. FIG. 13 is a schematic diagram of the format thereof. Symbol Rn shows the number of the general-purpose register.

Figure 14:
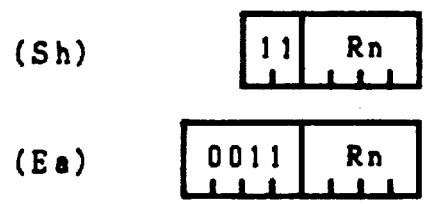
FIG. 14 is a schematic diagram showing a format wherein an addressing mode designating part is of a register indirect mode.

The register indirect mode takes the content of the memory whose address is the content of register as an operand. FIG. 14 is a schematic diagram of the format thereof. Symbol Rn shows the number of the general-purpose register.

Figure 15:
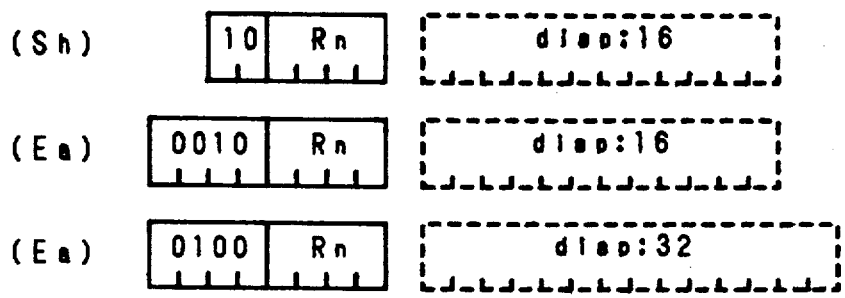
FIG. 15 is a schematic diagram showing a format wherein an addressing mode designating part is of a register relative indirect mode.

The register relative indirect mode includes two kinds of 16 bits and 32 bits of the displacement value. Each of them takes the content of the memory whose address is the value of the content of the register added to the displacement value of 16 bits or 32 bits as an operand. FIG. 15 is a schematic diagram of the format thereof. Symbol Rn shows the number of the general-purpose register. Symbol dips:16 and dips:32 show the displacement value of 16 bits and the displacement value of 32 bits, respectively. The displacement value is treated with a sign affixed.

Figure 16:
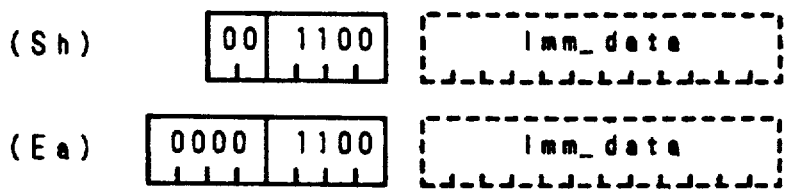
FIG. 16 is a schematic diagram showing a format wherein an addressing mode designating part is of an immediate value mode.

The immediate value mode takes the bit pattern designated in the instruction code as an operand while assuming it intact as a binary number. FIG. 16 is a schematic diagram of the format thereof. Symbol imm_data shows the immediate value. The size of imm_data is designated in the instruction as the operand size.

Figure 17:
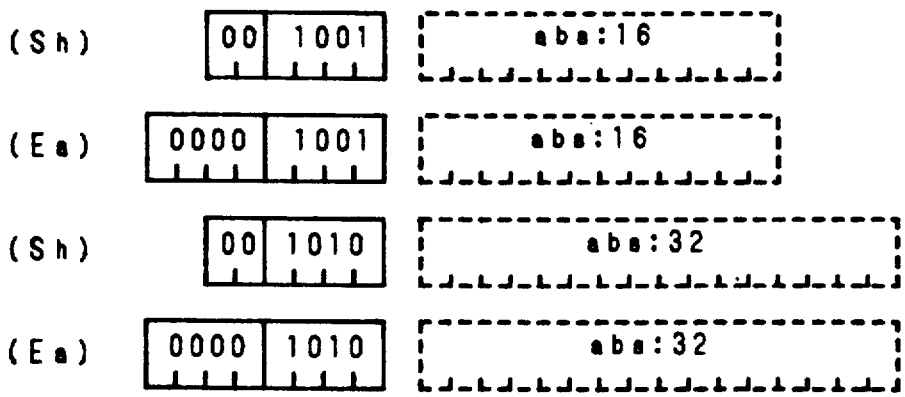
FIG. 17 is a schematic diagram showing a format wherein an addressing mode designating part is of an absolute mode.

The absolute mode includes two kinds of 16 bits and 32 bits for showing the address value. Each kind takes the content of the memory whose address is the bit pattern of 16 bits or 32 bits designated in the instruction code as an operand. FIG. 17 is a schematic diagram showing the format thereof. Symbols abs:16 and abs:32 show the address values of 16 bits and 32 bits, respectively. When the address is shown by abs:16, the designated address value is code-extended to 32 bits.

Figure 18:
FIG. 18 is a schematic diagram showing a format wherein an addressing mode designating part is of a PC relative indirect mode.

The PC relative indirect mode includes two kinds of 16 bits and 32 bits of the displacement value. Each takes the content of the memory whose address is the value of the content of a program counter whereto the displacement value of 16 bits or 32 bits is added as an operand. FIG. 18 is a schematic diagram showing the format thereof. Symbols disp:16 and disp:32 show the displacement value of 16 bits and the displacement value of 32 bits, respectively. The displacement value is treated with a sign affixed. In the PC relative indirect mode, the value of the program counter to be referenced is the head address of the instruction comprising the operand. Where the value of the program counter is referred in the chained address addressing mode, the head address of the instruction is also used as a reference value of PC relativity.

Figure 19:
FIG. 19 is a schematic diagram showing a format wherein an addressing mode designating part is of a stack POP mode.

The stack pop mode takes the content of the memory whose address is the content of a stack pointer (SP) as an operand. After operand access, the stack pointer SP is incremented by the operand size. For example, where 32-bit data is handled, the SP is renewed (incremented by +4 after the operand access. Designating of the stack pop mode for operands of sizes of B and H can also be performed, and the stack printer SP is renewed (incremented by +1 and +2, respectively. FIG. 19 is a schematic diagram of the format thereof. As to the one wherein the stack pop mode is insignificant for the operand, a reserve instruction exception is generated. Specifically, the stack pop mode designating for a write operand and a read-modify-write operand becomes the reserve instruction exception.

Figure 20:
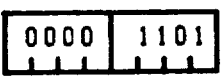
FIG. 20 is a schematic diagram showing a format wherein an addressing mode designating part is of a stack PUSH mode.

The stack push mode takes the content of the memory whose address is the content of the stack pointer SP decremented by the operand size as an operand. In the stack push mode, the stack pointer SP is decremented before operand access. For example, when handling 32-bit data, the stack printer SP is renewed (decremented) by −4 before operand access. It is also possible to designate the stack push mode for operands of sizes of B and H, and the stack pointer SP is renewed (decremented) by −1 and −2, respectively. FIG. 20 is a schematic diagram showing the format thereof. As to the one wherein the stack push mode is insignificant for the operand, a reserve instruction exception is generated. Specifically, the stack push mode designated for a read operand and a read-modify-write operate becomes the reserved instruction exception.

(1.4.2) "Chained Addressing Mode"

Addressing, whatever complicated, can basically be decomposed into combinations of addition and indirect reference. Accordingly, operations of addition and indirect reference are given in advance as primitives of addressing, and if they can be combined arbitrarily, any complicated addressing mode can be realized. The chained address addressing mode of the data processor of the present invention is an addressing mode based on such a conception. A complicated addressing mode is particularly useful for data reference between modules or the processing system of AI (Artificial Intelligence) language.

When designating the chained address addressing mode, in the basic addressing mode designated field, one from among three kinds of designating methods of a register base chained address mode, a PC base chained address mode and an absolute chained address mode is designated.

Figure 21:
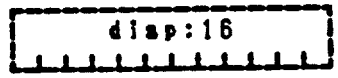
FIG. 21 is a schematic diagram showing a format of a register base chained addressing mode.

The register base chained address mode is an addressing mode taking the value of register as the base value of the chained address addressing to be extended. FIG. 21 is a schematic diagram showing the format thereof. Symbol Rn shows the number of the general-purpose register.

Figure 22:
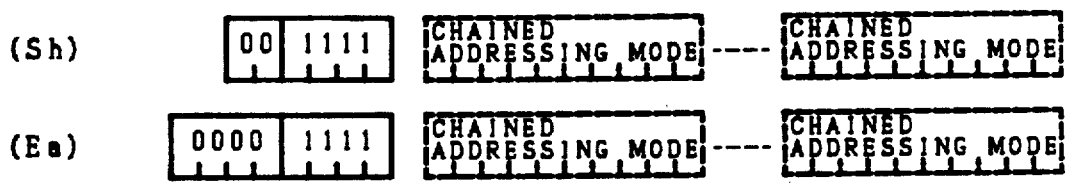
FIG. 22 is a schematic diagram showing a format of a PC base chained addressing mode.

The PC base chained address mode is an addressing mode taking the value of the program counter (PC) as the base value of the chained address addressing to be extended. FIG. 22 is a schematic diagram showing the format thereof.

Figure 23:
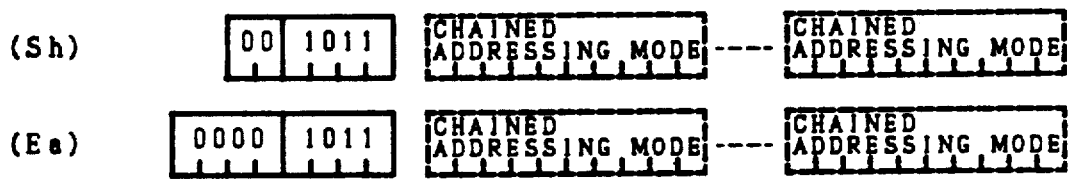
FIG. 23 is a schematic diagram showing a format of an absolute base chained addressing mode.

The absolute base chained address mode is an addressing mode taking zero as the base value of the chained address addressing to be extended. FIG. 23 is a schematic diagram of the format thereof.

Figure 24:
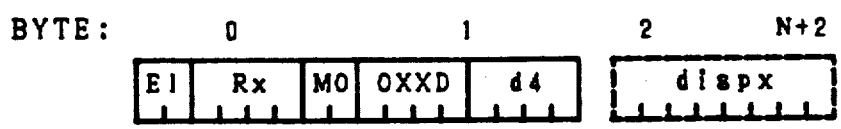
FIG. 24 is a schematic diagram showing designating fields for addition of displacement value, scaling and addition of index value, and indirect reference of memory in a format of one stage in a chained addressing mode.

The chained address mode designating field to be extended takes 16 bits as a unit, and this is repeated arbitrary times. by the chained address mode of one stage, addition of displacement, scaling ($\times 1$, $\times 2$, $\times 4$, $\times 8$) and addition of an index register, and indirect reference of a memory are performed. FIG. 24 is a schematic diagram showing the format of the chained address mode. Each field has meanings as shown below.

$E=0$: Continuation of the chained address mode is continued.

$E=1$: Address calculation ends. tmp→address of operand $I=0$: No memory indirect reference is performed. tmp+disp+Rx*Scale→tmp $I=1$: Memory indirect reference is performed. mem [tmp+disp+Rx*Scale]→tmp $M=0$: $<Rx>$ is used as an index.

$M=1$: Special index $<Rx>=0$ Index value is not added. (Rx=0)

$<Rx>=1$ Program counter is used as an index value. (Rx=PC)

$<Rx>=2-$ Reserved.

$D=0$: The value of field d4 of four bits in the chained address mode is quadrupled to be taken as a displacement value, and this value is added. The d4 is treated with a sign affixed, and is used by surely quadrupling it irrespective of the size of the operand.

$D=1$: The dispx (16/32 bits) designated in the extension part of the chained address mode is taken as a displacement value, the size of the extension part whereto this value is added is designated in the d4 field. d4=0001 dispx: 16 bits d4=0010 dispx: 32 bits XX: Index scale (scale=1/2/4/8).

Where scaling of $\times 2$, $\times 4$, $\times 8$ has been performed for the program counter, an indefinite value is entered as an intermediate value (tmp) after completion of processing of that stage. The effective address obtained by this chained address mode becomes an unpredictable value, but no exception is generated. Designating of scaling for the program counter should not be performed.

Figure 25:
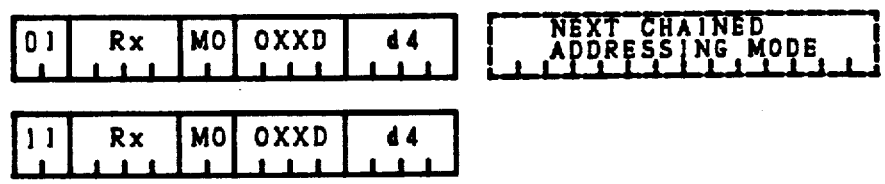
FIG. 25 is a schematic diagram showing a variation of whether or not the chained address mode is to be continued.
Figures 26, 29:
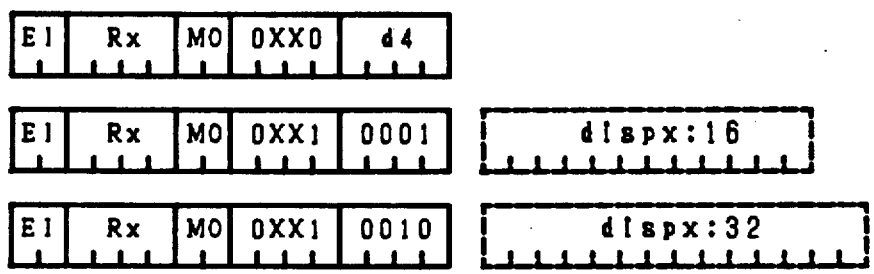
FIG. 26 is a schematic diagram showing a variation of size of displacement value.
FIG. 29 is a schematic diagram showing a basic instruction format of the data processor of the present invention.

FIG. 25 and FIG. 26 show variations on the instruction format formed by the chained address mode.

FIG. 25 shows variations of continuation and completion of the chained address mode.

FIG. 26 shows variations on the size of displacement.

If the chained address mode of an arbitrary number of stages can be utilized, the case-sorting on a number of stages basis in the compiler can be dispensed with, and therefore an advantage of alleviating the burden on the compiler is obtainable. This is because, even if frequency of chained address reference is very low, the compiler has to be able to generate a correct code without fail. For this reason, an arbitrary number of stages can be applied in the format.

(1.5) "Exceptional Processing"

The data processor of the present invention has abundant exceptional processing functions for alleviating software load. In the data processor of the present invention, there are three kinds of the exceptional processing, which are re-execution of instruction processing (named exception), completion of instruction processing (named trap) and interruption. In the data processor of the present invention, these three kinds of exceptional processing and system faults are generally called EIT.

(2) "Configuration of Function Block"

Figure 27:
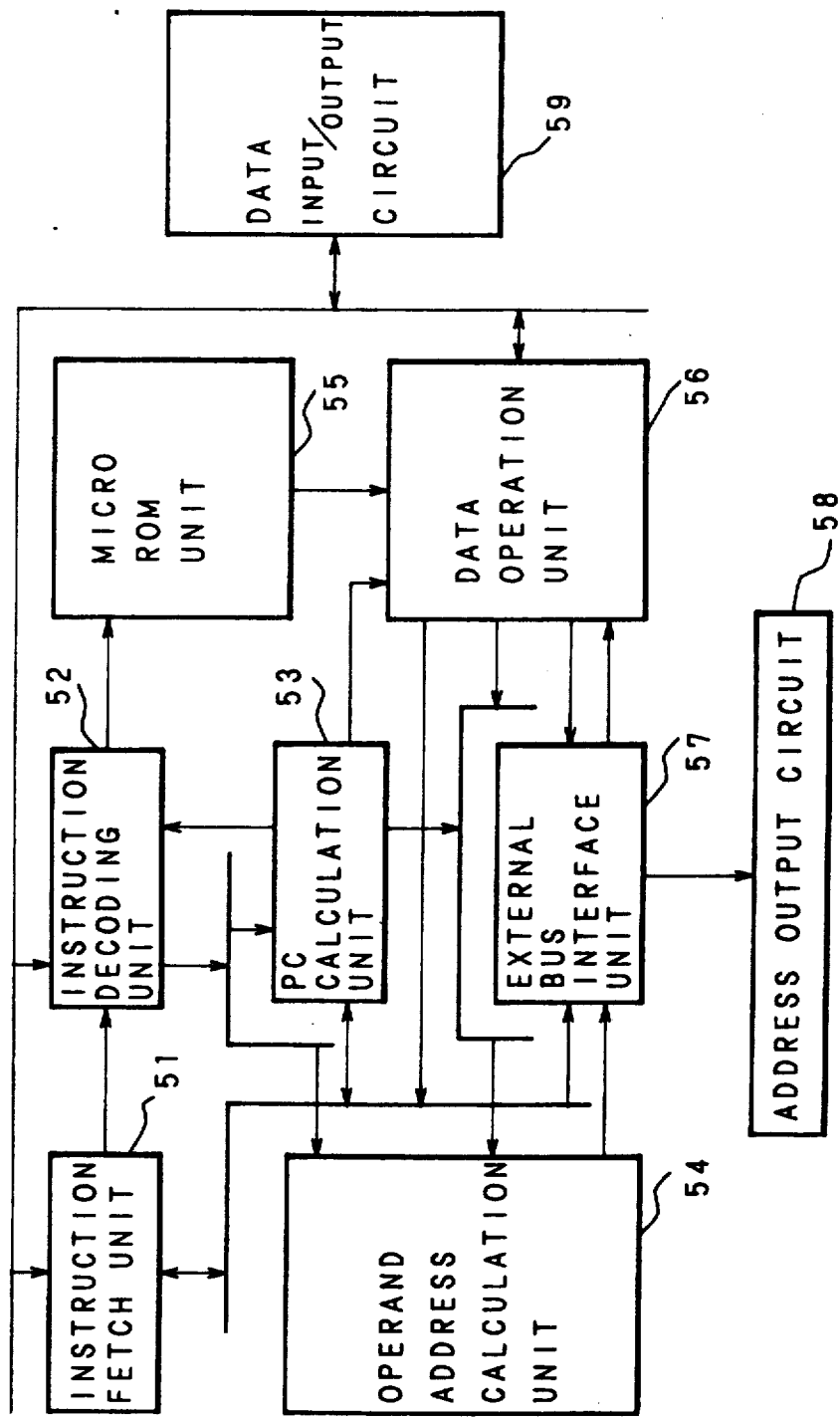
FIG. 27 is a block diagram showing a configuration of the data processor of the present invention.

FIG. 27 is a block diagram showing a configuration of the data processor of the present invention.

The interior of the data processor of the present invention is functionally divided roughly into an instruction fetch unit 51, an instruction decoding unit 52, a PC calculation unit 53, an operand address calculation unit 54, a micro ROM unit 55, a data operation unit 56 and an external bus interface unit 57.

In FIG. 27, in addition to the above-described units, an address output circuit 58 for outputting address to the exterior of a CPU and a data input/output circuit 59 for inputting and outputting data from and to the exterior of the CPU are shown being separated from the other function block units.

(2.1) "Instruction Fetch Unit"

The instruction fetch unit 51 which comprises a branch buffer, an instruction queue and a controlling unit thereof, determines the address of an instruction to be fetched next and fetches the instruction from the branch buffer or a memory outside the CPU. It also performs instruction registering to the branch buffer.

The branch buffer is small-scaled, therefore operating as a selective cache.

Detailed description on the operation of the branch buffer is disclosed in the Japanese Patent Application Laid-Open No. 63-56731 (1988).

The address of an instruction to be fetched next is calculated by a dedicated counter as the address of the instruction to be inputted to an instruction queue 1. In the case where a branch or jump is generated, an address of a new instruction is transferred from the PC calculation unit 53 or the data operation unit 56.

In the case where an instruction is fetched from a memory outside the CPU, the address of the instruction to be fetched is outputted from the address output circuit 58 to the outside of the CPU through the external bus interface unit 57, and an instruction code is fetched from the data input/output circuit 59. Then, among the instruction codes in buffering, the instruction code to be decoded next is output to the instruction decoding unit 52.

(2.2) "Instruction Decoding Unit"

In the instruction decoding unit 52, basically an instruction code is decoded on a 16-bit (half word) basis. This block comprises a FHW decoder for decoding an operation code included in the first half word, a NFHW decoder for decoding an operation code including in the second and the third half words, and an addressing mode decoder for decoding an addressing mode. These FHW decoder, NFHW decoder and addressing mode decoder are generally called a first decoder 2.

There are also a second decoder 3 which further decodes an output of the FHW decoder and the NFHW decoder and calculates an entry address of the micro ROM, a branch predicting mechanism for performing branch prediction of a conditional branch instruction, and an address calculation conflict checking mechanism for checking pipeline conflict in calculating an operand address.

The instruction decoding unit 52 decodes the instruction code being inputted from the instruction fetch unit 51 by 0–6 bytes per two clocks (one step). Among the results of decoding, information on operation in the data operation unit 56 is outputted to the micro ROM unit 55, information on operand address calculation is outputted to the operand address calculation unit 54, and information on PC calculation is outputted to the PC calculation unit 53, respectively.

(2.3) "Micro ROM Unit"

The micro ROM unit 55 comprises a micro ROM for storing microprograms which mainly controls the data operation unit 56, a micro sequencer, and a micro instruction decoder. A micro instruction is read out from the micro ROM once per two clocks (one step). The micro sequence accepts processing of exception, interruption and trap (the three are generally called EIT) in a hardware manner in addition to the sequential processings shown by the microprograms. The micro ROM unit 55 also controls a store buffer. To the micro ROM unit 55, there are inputted flag information generated by interruption independent of the instruction code or by the result of operation execution, and output of an instruction decoding unit such as output of a second decoder 3. Output of the micro decoder is mainly performed to the data operation unit 56, but some information such as information of stopping other preceding processing due to execution of a jump instruction is outputted also to other blocks.

(2.4) "Operand Address Calculation Unit"

The operand address calculation unit 54 is controlled in a hardwired manner by information on operand address calculation outputted from the address decoder of the instruction decoding unit 52 or the like. In this block, substantially all of processings on operand address calculation are performed. Checking is made for whether or not the address of memory access for memory indirect addressing and the operand address can be entered in an I/O area mapped in the memory.

The result of address calculation is sent to the external bus interface unit 57. The values of the general-purpose register and the program counter required for address calculation are inputted from the data operation unit.

In performing the memory indirect addressing, the memory address to be referred is outputted from the address output circuit 58 to the outside of the CPU through the external bus interface unit 57, and the indirect address value inputted from the data input/output unit 59 is fetched through the instruction decoding unit 52.

(2.5) "PC Calculation Unit"

The PC calculation unit 53 is controlled in a hardwired manner by information on PC calculation outputted from the instruction decoding unit 52, and calculates the PC value of an instruction. The data processor of the present invention has a variable-length instruction set, and the length of that instruction can be found only after the instruction is decoded. For this reason, the PC calculation unit 53 generates the PC value of the next instruction by adding the length of the instruction outputted from the instruction decoding unit 52 to the PC value of the instruction in decoding. In the case where the instruction decoding unit 52 decodes a branch instruction and directs a branch in the decoding stage, the PC value of a branch destination instruction is calculated by adding a branch displacement in place of the instruction length to the PC value of the branch instruction. In the data processor of the present invention, performing a branch in the instruction decoding stage in response to the branch instruction is called pre-branch.

On this pre-branch approach, detailed description is disclosed in the Japanese Patent Application Laid-Open No. 63-59630 (1988) and the Japanese Patent Application Laid-Open No. 63-55639 (1988).

The result of calculation in the PC calculation unit 53 is outputted as the PC value of each instruction together with the result of decoding of the instruction, and in addition, is outputted to the instruction fetch unit 51 as the address of the instruction to be decoded next at pre-branch. Also, it is used for the address for branch prediction of the instruction to the decoded next in the instruction decoding unit 52.

On the branch predicting approach, detailed description is disclosed in the Japanese Patent Application Laid-Open No. 63-175934 (1988).

(2.6) "Data Operation Unit"

The data operation unit 106 is controlled by microprograms, and executes the operation required for realizing the function of each instruction by means of registers and an arithmetic unit according to output information of the micro ROM unit 55. In the case where the operand to be operated is an address or an immediate value, the address or the immediate value calculated in the operand address calculation unit 54 is obtained by passing it through the external bus interface unit 57. In the case where the operand to be operated on is in a memory outside the CPU, the bus interface unit outputs the address calculated in the address calculation unit 54 from the address output circuit 58, and the operand fetched from the memory outside the CPU is obtained through the data input/output circuit 59.

Arithmetic units include an ALU, a barrel shifter, a priority encoder, a counter, and a shift register. The registers and the main arithmetic units are connected through three buses, and one micro instruction for directing operation between registers is processed in two clocks (one step).

In the case where an access to the memory outside the CPU is required at the data operation, the address is outputted from the address output circuit 58 to the outside of the CPU through the external bus interface unit 57 by the direction of the microprogram, and the aimed data is fetched through the data input/output circuit 59.

In the case where data is stored in the memory outside the CPU, the address is outputted from the address output circuit 58 through the external bus interface unit 57, and simultaneously the data is outputted from the data input/output circuit 59 to the outside of the CPU. In order to efficiently perform operand store, a four-byte store buffer is installed in the data operation unit 56.

In the case where the data operation unit 56 obtains a new instruction address by processing a jump instruction or an exceptional processing, this is outputted to the instruction fetch unit 51 and the PC calculation unit 53.

(2.7) "External Bus Interface Unit"

The external bus interface unit 57 controls communication through the external bus of the data processor of the present invention. All accesses to memories are performed in a clock-synchronized manner, and can be performed in a minimum of two clock cycles (one step).

Access requests to memories are generated independently from the instruction fetch unit 51, the operand address calculation unit 54 and the data operation unit 56. The external bus interface unit 57 arbitratesmediates these memory access requests. Furthermore, the access to the data located at the memory address striding over the arrangement boundary of 32 bits (one word) which is the size of the data bus connecting the memory to the CPU is performed in a manner that striding over the word boundary is automatically detected in this block and the access is decomposed into memory accesses of two times.

This unit also performs conflict preventing processing and by-pass processing from the store operand to the fetch operand in the case where the operand to be pre-fetched and the operand to be stored are superposed.

(3) "Pipeline Processing Mechanism"

Figure 28:
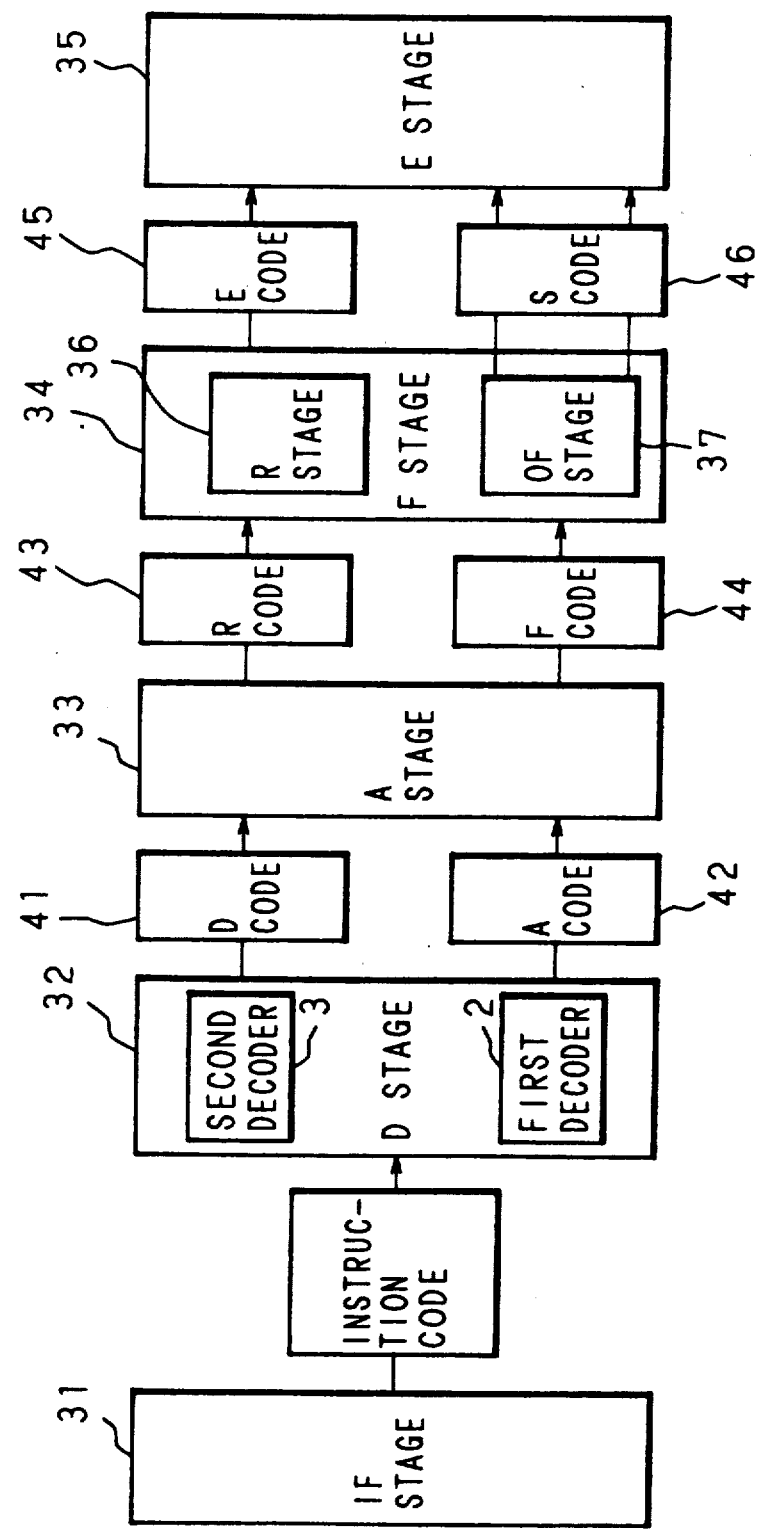
FIG. 28 is a block diagram showing a configuration of a pipeline function of the data processor of the present invention.
Figure 30:
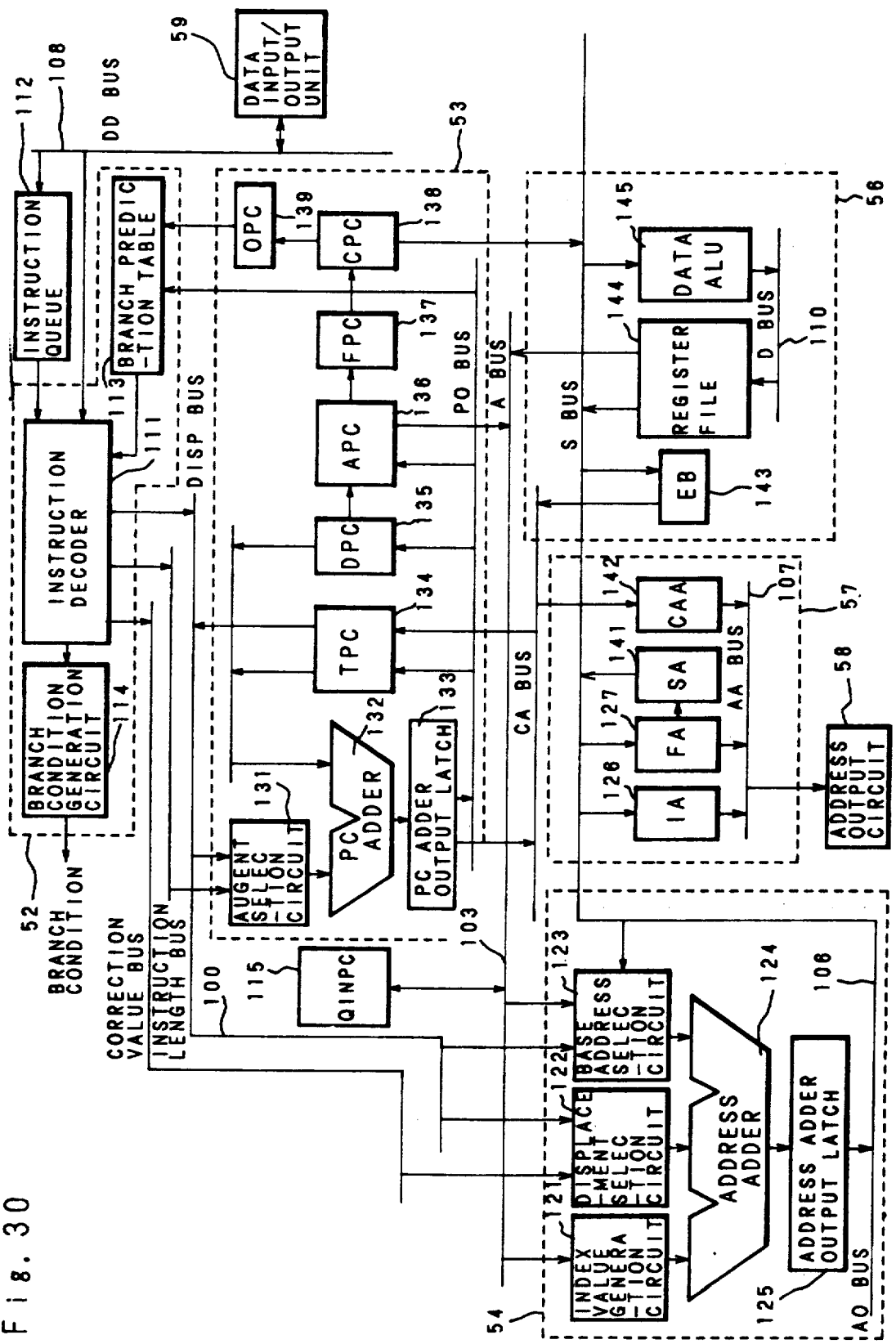
FIG. 30 is a block diagram showing a detail configuration of a branch instruction processing unit in the data processor of the present invention.
Figure 31:
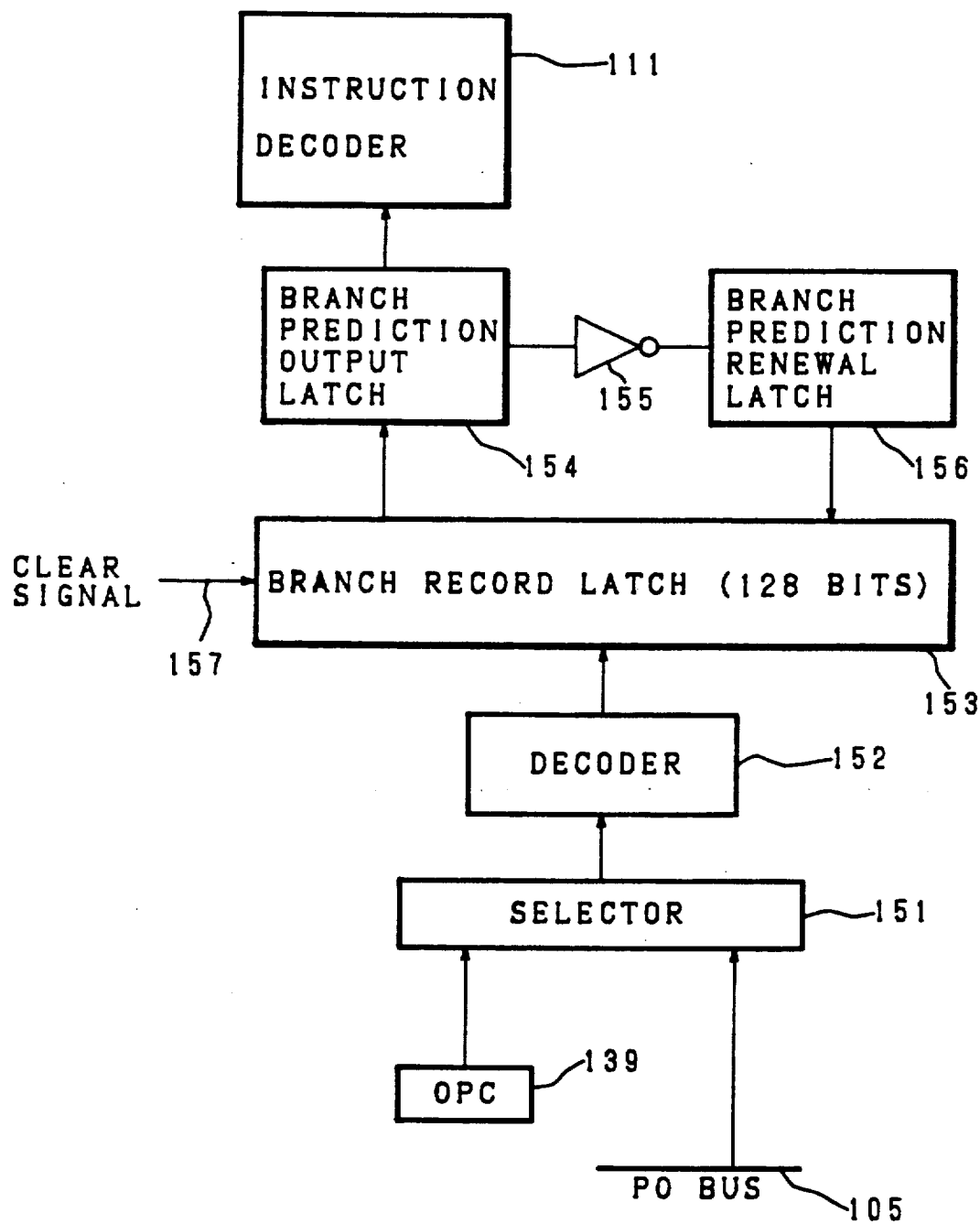
FIG. 31 is a block diagram showing a detail configuration of a branch prediction table of the data processor of the present invention.

FIG. 28 is a schematic diagram showing a pipeline processing mechanism of the data processor of the present invention.

The basis of pipeline processing has a five-stage configuration which comprises an instruction fetch stage (IF stage) 31 for prefetching an instruction. a decoding stage (D stage) 32 for decoding the instruction, and operand address calculation stage (A stage) 33 for performing address calculation of an operand, an operand fetch stage (F stage) 34 consisting of a portion for performing micro ROM access (particularly called a R stage 36) and a portion for prefetch an operand (particularly called an OF stage 37), and an execution stage (E stage) 35 for executing an instruction.

The E stage 35 comprises a one-stage store buffer, and besides, in part of high-function instructions, the execution itself of the instruction is performed in a pipeline manner, and therefore, an actual effect of pipeline processing of five or more stages is obtainable.

Each stage operates independently from the other stages, and theoretically the five stages make perfectly independent operations. Each stage can perform one-time processing in a minimum of two clocks (one step). Accordingly, ideally, the pipeline processing progresses one after another on a two clock (one step) basis.

The data processor of the present invention comprises some instructions which cannot be processed only by the basic pipeline processing of one time such as an operation between memory and memory or a memory indirect addressing, but the data processor of the present invention is designed in such a manner that a balanced pipeline processing can be performed whenever possible for processing of these instructions. For the instruction having a plurality of memory operands, the pipeline processing is performed based on the number of memory operands by decomposing it into a plurality of pipeline processing units (step code) at the decoding stage.

On the decomposing method of the pipeline processing unit, detailed description is disclosed in the Japanese Patent application Laid-Open No.63-89932 (1988).

Information transferred from the IF stage 31 to the D stage 32 is an instruction code itself. Information transferred from the D stage 32 to the A stage 33 includes two kinds of information, one on operation designated by an instruction (called a D code 41) and the other on address calculation of operand (called an A code 42).

Information transferred from the A stage 33 to the F stage 34 includes an R code 43 comprising an entry address of a microprogram or a parameter of the microprogram and an F code 44 comprising an operand address and information on directing the method of access.

Information transferred from the F stage 34 to the E stage 35 is an E code 45 comprising operation control information and literal and an S code 46 comprising an operand or an operand address.

EIT detected in the stage other than the E stage 35 does not start the EIT processing until the code thereof reaches the E stage 35. This is because only the instruction processed in the E stage 35 is an instruction at the step of executing, and the instructions having been processed between the IF stage 31 and the F stage 34 do not reach the step of executing yet. Accordingly, for the EIT detected in the stage other than the E stage 35, the detection thereof is recorded in the step code, and it is only transmitted to the following stage.

(3.1) "Pipeline Processing Unit"

(3.1.1) "Classification of Instruction Code Fields"

The pipeline processing unit of the data processor of the present invention is determined by utilizing the feature of the format of an instruction set.

As described in Section (1), the instruction of the data processor of the present invention is a variable-length instruction of two-byte unit, and basically the instruction is configurated by repeating one to three times "a two-byte instruction base part + an addressing extension part of 0 to 4 bytes".

In many cases, the instruction base part comprises an operation code part and an addressing mode designating part, and in the case where index addressing or memory indirect addressing is required, "a two-byte chained address mode designating part + an addressing extension part of 0 to 4 bytes" is affixed by an arbitrary number in place of the addressing extension part. The extension part of two or four bytes which is peculiar to the instruction is also affixed lastly depending on the instruction.

The instruction base part comprises an operation code of an instruction, a basic addressing mode, literal and the like. The addressing extension part is any one of displacement, an absolute address, an immediate value and displacement of branch instruction. The extension part peculiar to the instruction comprises a register map, an immediate value designating of the I-format instruction and the like.

FIG. 29 is a schematic diagram showing the feature of the basic instruction format of the data processor of the present invention.

(3.1.2) "Decomposition of Instruction into Step Codes"

The data processor of the present invention performs the pipeline processing making the most of the feature of the above-mentioned instruction format.

In the D stage 32, "a two-byte instruction base part + an addressing extension part of 0 to 4 bytes", "a chained address mode designating part + an addressing extension part", or an extension part peculiar to the instruction is processed as one decoding unit. The result of decoding of each time is called a step code, and in and after the A stage 33, this step code is taken as a unit of pipeline processing. The number of step codes is peculiar to each instruction, and in the case where the chained address mode designating is not performed, one instruction is divided into a minimum of one step code to a maximum of three step codes. In the case where the chained address mode designating is performed, the number of step codes is increased by a number as required. Note that this is performed only in the decoding step as described later.

(3.1.3) "Control of Program Counter"

All of the step codes existing on the pipeline of the data processor of the present invention have a possibility of being the ones for another instruction, and for this reason, the value of the program counter is controlled on a step code basis. All of the step codes have the program counter value of the instruction whereon that step code is based. The program counter value flowing through each stage of the pipeline while accompanying the step code is called a step program counter (SPC). The SPC is transferred sequentially from one pipeline stage to the other.

(3.2) "Processing of Each Pipeline Stage"

As shown in FIG. 28, for convenience sake, names are given to the input and output step codes of each pipeline stage. The step codes perform processing relating to the operation codes, and include two series; a series becoming entry addresses of microprograms and parameters for the E stage 35 and a series becoming operands for microinstructions of the E stage 35.

(3.2.1) "Instruction Fetch Stage"

The instruction fetch stage (IF stage) 31 fetches an instruction from the memory of the branch buffer and input it to the instruction queue 1, and outputs an instruction code to the D stage 32. Input of the instruction queue 1 is performed in an aligned four-byte unit. In the case where an instruction is fetched from the memory, a minimum of two clocks (one step) are required for the aligned four bytes. In the case where the branch buffer hits, fetching can be made in one clock per aligned four bytes. The output unit of the instruction queue 1 is variable on a two-byte basis, and a maximum of six bytes can be outputted during two clocks. Immediately after a branch, two bytes of the instruction base part can also be transferred directly to the instruction decoder by by-passing the instruction queue 1.

Control of registering, clearing and the like of the instruction to the branch buffer, management of addresses of the instructions to be prefetched and control of the instruction queue are also performed in the IF stage 31.

The EITs detected in the IF stage 31 include a bus access exception in fetching an instruction form the memory or an address conversion exception due to memory protection violation.

(3.2.2) "Instruction Decoding Stage"

The instruction decoding stage (D stage) 32 decodes an instruction code inputted from the IF stage 31. Decoding is performed by two clock (one step) basis using the first decoder 2 consisting of the FHW decoder, the NFHW decoder and the addressing mode decoder in the instruction decoding unit 52, and an instruction code of 0 to 6 bytes is consumed in the decoding processing of one-time (no instruction code is consumed in the outputting processing of the step code comprising the return address of the RET instruction). By one-time decoding, the control code which is the A code 42 as address calculation information, address modification information, the control code which is the D code 41 as the result of intermediate decoding of the operation code, and eight-bit literal information are inputted to the A stage 33.

In the D stage 32, control of the PC calculation unit 53 of each instruction, branch prediction processing, pre-branch processing for the pre-branch instruction and outputting processing of the instruction code from the instruction queue 1 are also performed.

The EITs detected in the D stage 52 include a reserved instruction exception and an odd address jump trap at pre-branch. Various EITs transferred from the IF stage 32 are also transferred to the A stage 33 through processing of encoding into the step code.

In the D stage 32, when chained address addressing mode is processed, the base instruction part of two bytes is processed as one decoding unit generate D code 41 and A code 42, and "chained address mode designating part + addressing extension part" is processed as one decoding unit to generate D code 41 and A code 42.

(3.2.3) "Operand Address Calculation Stage"

Processing functions of the operand address calculation stage (A stage) 33 are roughly divided into two parts. One is processing for post-decoding of the operation code using the second decoder 3 of the instruction decoding unit 52 and the other is for calculation of operand address in the operand address calculation unit 54.

The post-decoding processing of the operation code inputs the D code 41 and outputs the R code 43 comprising write reserve of register and memory, entry address of microprogram and parameters for microprogram. In addition, the write reserve of the register or memory is for preventing a wrong address calculation by re-writing the content of the register or memory referenced in the address calculation with the instruction preceding on the pipeline.

To avoid a dead lock, the write reserve of the register or memory is preformed on an instruction basis rather than on a step code basis.

On the write reserve to the register or memory, detailed description is disclosed in the Japanese Patent Application No. 62-114394(1987).

The operand address calculation processing inputs the A code 42, performs addition in the operand in the operand address calculation unit 54 according to the A code 42 or performs address calculation by combining memory indirect reference, and outputs the result of the calculation as the F cord 44. At this time, conflict check is done in reading-out of the register and memory attending on the address calculation, and if a conflict is indicated because the preceding instruction has not completed the writing processing to the register or the memory, the processing waits until the preceding instruction completes the write processing in the E stage 35. Checking is made for whether or not the operand address and the address of memory indirect reference can enter the I/O area mapped in the memory.

The EITs detected in the A stage 33 include reserved instruction exception, privilege instruction exception, bus access exception, address conversion exception and debugging trap generated by an operand break point hit at memory indirect addressing. When it is indicated that the D code 41 or the A code 42 itself has caused EIT, the stage 33 does not perform address calculation processing for that code, and that EI is transmitted to the R code 43 and the F code 44.

In the case where processing of the chained address addressing mode is performed in the A stage 33, first decoding processing is performed based on the D code 41 generated by the instruction base part in the D stage 32, and the R code 43 is generated, and the second decoder 3 retains the R code 43 until the F code 44 is generated.

The operand address calculation unit 54 retains an interim result of address calculation based on the A code 42 generated by the instruction base part in the d stage 32. Next, in the D code 41 generated by the "chained address mode designating part + addressing extension part" in the D stage 32, only EIT information in the D stage 32 is significant, and therefore decoding processing by the second decoder 3 is not performed, and whether or not an EIT has occurred in the D stage is detected. Furthermore, based on the A code 42 generated by the "chained address addressing mode designating part + addressing extension part" in the D stage 32 and on the above-described interim result of address calculation, address calculation and memory indirect reference are performed if instructed, and the processing is repeated by inputting the D code 41 and the A code 42 which have been generated by the next "chained address mode designating part + addressing extension part" until the address calculation is completed. Then, when the address calculation is completed and the F code 44 is generated, it is outputted to the F stage 34 along with the R code 43 retained by the second decoder 3.

(3.2.4) "Micro ROM Access Stage"

Processing of the operand fetch stage (F stage) 34 is also divided roughly into two parts. One is access processing of the micro ROM, particularly called the R stage 36. The other is operand prefetch processing, particularly called the OF stage 37. The R stage 36 and the OF stage 37, which do not necessarily operate at the same time, operate independently depending on whether or not the memory access right can be acquired.

The micro ROM access processing which is the processing of the R stage 36 is the micro ROM access and micro instruction decoding processing for generating the E code 45 which is an execute control code used for execution in the following E stage 35 for the R code 43. In the case where processing for one R code 43 is decomposed into two or more microprogram steps, the micro ROM is used in the E stage 35, and the following R code 43 waits for micro ROM access. The micro ROM access to the R code 43 is performed when the last micro instruction is executed in the preceding E stage 35. In the data processor of the present invention, almost all of the basic instructions are executed in one microprogram step, therefore, there are many actual cases that the micro ROM access to the R code 43 is performed one after another.

There is no EIT to be detected anew in the R stage 36.

When the R code 43 indicates the EIT of instruction processing re-execution type, the microprogram for that EIT processing is executed, and therefore the R stage 36 fetches the micro instruction according to the R code 43. In case where the R code 43 indicates an odd address jump trap, the R stage 36 transmits it through the E code 45. This is for pre-branch, and in the E stage 35, if no branch is made in that E code 45, an odd address jump trap is generated with the pre-branch being to be effective.

(3.2.5) "Operand Fetch Stage"

The operand fetch stage (OF stage) 37 performs the operand prefetch processing among the above-mentioned two processings performed in the F stage 34.

The operand prefetch processing inputs the F code 44 and outputs the fetched operand and the address thereof as the S code 46. One F code 44 may stride over the word boundary, but designates operand fetching of four bytes or less. The F code 44 also comprises designating of whether or not access to the operand is to be performed, and in the case where the operand address itself or the immediate value calculated in the A stage 33 is transferred to the E stage 35, no operand prefetch is performed, and the content of the F code 44 is transferred as the S code 46. In the case where the operand intended to be prefetched coincides with the operand intended to be write-processed in the E stage 35, no operand prefetching is performed from the memory, but being performed by by-passing it. For the I/O area, the operand prefetch is delayed, and the operand fetch is performed only after all the preceding instructions have been completed.

The EITs detected in the OF stage 37 include a bus access exception, an address conversion exception, and a debugging trap generated by a break point hit to the operand prefetch. When the F code 44 indicates an EIT other than the debugging trap, it is transferred to the S code 46, and no operand prefetch is performed. When the F code 44 indicates a debugging trap, the same processing as the case where no EIF is indicated for that F code 44 is performed, and the debugging trap is transmitted to the S code 46.

(3.2.6) "Execution Stage"

The execution stage (E stage) 35 operates with the E code 45 and the S code 46 taken as inputs. This E stage 35 is a stage for executing instructions, and the whole processings performed in the stages before and in the F stage 34 are pre-processings for the E stage 35. In the case where a jump instruction is executed in the E stage 35 or the EIT processing is started, all the processings from the IF stage 31 to the F stage 34 are disabled. The E stage 35 is controlled by microprograms, and the instruction is executed by executing a series of microprograms starting with the entry address of microprogram indicated in the R code 43.

Read of the micro ROM and execution of the microinstruction are performed in a pipeline manner. Accordingly, in the case where a branch takes place in the microprogram, a gap (blank) of one microstep is generated. The E stage 35 can also perform pipeline processing of an operand store of four bytes or less and the following microinstruction execution by utilizing the store buffer in the data operation unit 56.

In the E stage 35, the write reserve to the register and the memory performed in the A stage 33 is released after write of the operand.

In the case where a conditional branch instruction generates a branch in the E stage 35, the branch prediction for that conditional branch instruction has been wrong, and therefore rewriting of the branch history is performed.

The EITs detected in the e stage 35 include bus access exception, address conversion exception, debugging trap, odd address jump trap, reserve function exception, wrong operand exception, reserve stack format exception, zero division trap, unconditional trap, conditional trap, delay context trap, external interruption, delay interruption, reset interruption and system faults.

The EITs detected in the E stage 35 are all EIT-processed, but the EITs which are detected between the IF stage 31 and the F stage 34 before the E stage and are reflected in the R code 43 or the S code 46 are not necessarily EIT-processed. All the EITs which are detected among from the IF stage 31 to the F stage 34, but do not reach the E stage 35 because the preceding instruction has executed a jump instruction in the E stage 35 or the like are all canceled. The instruction having caused that EIT is assumed to have not been executed from the beginning.

The external interruption and the delayed interruption are accepted directly to the E stage 35 at a pause of the instruction, and necessary processing is executed by microprograms. Processings of other various EITs are performed by microprograms.

(3.3) "Status Control of Each Pipeline Stage"

Each stage of the pipeline has an input latch and an output latch, and is based on operation independent of other stages. Each stage starts the next processing after such whole processes as the one-preceding processing has been completed, the result of that processing has been transferred from the output latch to the input latch of the next stage, and all input signals required for the next processing have been prepared in the input latch of the stage of its own.

This means that each stage starts the next processing after such whole processes as all the input signals to the next processing outputted from the one-preceding stage are enabled, the result of the current processing is transferred to the input latch of the post-stage, and the output latch becomes empty.

It is required that all input signals are prepared at a timing with one clock before the operation start in each stage. If the input signals are not all prepared, that stage is put in the waiting state (input waiting). If transfer from the output latch to the input latch of the next stage is done, it is required that the input latch of the next stage is in the empty state, and when the input latch of the next stage is not empty, the pipeline stage is also put in the waiting state (output waiting). If the required memory access right cannot be acquired, or wait is inserted into the memory access under processing, or another pipeline conflict occurs, the processing itself of each stage is delayed.

(4) "Processing of Branch Instruction"

As mentioned above, since the data processor related to the invention is provided with multistage pipeline processing mechanism, overhead is applied when executing branch instruction. To minimize the overhead, the data processor related to the invention executes dynamic branch prediction processing, which is intended to access to the branch instruction as early as possible by branching the instruction at the decoding stage instead of accessing to the branch instruction at the instruction execution stage. Generally, not only the data processor related to the invention, but any conventional data processor also frequently executes the branch instruction, and taking this into consideration, the invention significantly promotes overall performance characteristic of the data processor by virtue of the dynamic branch prediction processing.

(4.1) "Kinds of Branch Instructions"

The preferred embodiment of the data processor related to the invention calls the instruction executing dynamic branch prediction processing "pre-branch instruction". This includes such an instruction which compulsorily branches itself despite application of dynamic prediction such as the unconditional branch instruction.

The branch instruction provided for the data processor related to the invention is classified into four kinds according to the property of branch condition whether it is static or dynamic and also whether the branch target is static or dynamic. In this preferred embodiment, the following two kinds of these instructions are called to be the "pre-branch instructions".

The first kind of the branch instruction is the one with the branch condition and the branch target are static in property. This kind of instruction includes unconditional branch instruction (BRA) and subroutine calling instruction (BSR). The second kind of the branch instruction has branch condition which is dynamic, although the branch target is static in property. This kind of instruction includes conditional branch instruction (Bcc) and loop control instruction (ACB).

(4.2) "Functional Configuration of the Branch Instruction Processing Circuit"

FIG. 5 represents the detailed block diagram of the branch instruction processing circuit of the data processor of the invention.

FIG. 5 includes an address output circuit 58, a data input circuit 59, and partially detailed views of circuits provided in an instruction fetch unit 51, an instruction decoding unit 52, a PC (program counter) calculation unit 53, an operand address calculation unit 54, a data operation unit 56, and an external bus interface unit 57, respectively.

An instruction decoder 111 and input side of a PC adder 132, input side of an address adder 124 are connected to each other via a DISP bus 100 which transfers the displacement value and the displacement value of branch instruction. The instruction decoder 111 and input side of the address adder 124 are also connected to each other via a correction value bus 101 which transfers the length of instruction code available for generating step codes and predecremented value under the stack push mode. The instruction decoder 111 and input side of the PC adder 132 are also connected to each other via the instruction length bus 101 which transfers the length of instruction code available for generating step code. A register file 144 and input side of the address adder 124 are connected to each other via an A bus 103 which transfers address value stored in the register file 144.

An instruction code from an instruction queue 112 is inputted to the instruction decoder 111, and branch prediction bit from a branch prediction table 113 is inputted to the same. Depending on the result of branch prediction, a branch condition generating circuit 114 which is provided for the output part of the instruction decoder 111 and determines whether the branch condition designated field of the conditional branch instruction should directly be outputted to the E stage 35 or it should be outputted with inverting the specified condition.

An augend value selection circuit 131 selectively receives either of the value of the instruction length bus 101 or the value of the DISP bus 100. A DPC 135 keeps a PC value of an instruction decoded by the D stage 32. A TPC 134 keeps a working PC value at the boundary of step codes. The PC adder 132 receives signal from the augend value selection circuit 131 and from either the DPC 135 or the TPC 134. Output of the PC adder 132 is delivered to a CA bus 104 and a PO bus 105 via a PC adder output latch 133. The PO bus 105 is also connected to a latch TPC 134, latch DPC 135, latch APC 136 which keeps the PC value of the instruction being processed by the A stage 33, and branch prediction table 113. To input new instruction addresses when branching or jumping occur in E stage 35, the TPC 134 is provided with another input route connected to the CA bus 103.

Output from a correction value bus 102 and DISP bus 100 are inputted to a displacement selection circuit 122, and then, either of those outposts is inputted to the address adder 124. Output from DISP bus 100 and A bus 103 are inputted to a base address selection circuit 123, and then, either of those outputs is inputted to the address adder 124. The address adder 124 executes termary addition with an output of the displacement selection circuit 122, the base address selection circuit 123, and the index value generating circuit 121 which makes value being input from the A bus 103 values of equivalent, double, four times, and eight times by shifting as the input. Output value of the address adder 124 is outputted to an AO bus 106 via address adder output latch 125. The AO bus 106 is connected to a latch IA 126 and a latch FA 127, where the latch IA 126 keeps such address value when address output circuit 58 outputs address value to external of CPU via an AA bus 107 at executing memory indirect addressing, whereas the latch FA 127 keeps operand address when the address output circuit 58 outputs operand address value to external of CPU via the AA bus 107 at prefetching operand in F stage 34.

The latch FA 127 has an output route connected to a latch SA 141 which keeps the operand address added up by the address adder 124 in order to use the operand address at the E stage 35. The latch SA 141 has an output route connected to S bus 109 which is the general purpose data bus of data operation unit 56. The CA bus 104 transferring address of instruction is connected to the following elements; a PC adder output latch 133, a TPC 134, a counter QINPC 115 which controls addresses of instruction codes prefetched by the instruction fetch unit 51, a latch CAA 142 which keeps value of address requires for fetching instructions when the address output circuit 58 outputs this address to external of CPU via the AA bus 107, and a latch EB 143 which receives new instruction address from the S bus 109 when either branching or jumping occurs in the E stage 35. An APC 136 has outputs route connected to the A bus 103 and a latch FPC 137 which keeps the PC value of instruction being processed at the F stage 34. The FPC 137 has an output route connected to latch CPC 138 which keeps the PC value of instruction being processed at the E stage 35. The CPC 138 has output routes connected to the S bus 109 and a latch OPC 139 which keeps the value of the least significant byte of the PC value available for rewriting the branch history. The register file 144 is composed of general purpose register and working register and has output routes connected to the S bus 109 and the A bus 103, and an input route connected to the D bus 110. A data calculator 145, which is a calculating mechanism of the data operation unit 56, has an input route connected to the S bus 109 and an output route connected to the D bus 110.

(4.3) "Method of Branch Prediction"

The data processor related to the invention securely predicts that of the unconditional branch instruction (BRA), subroutine branch instruction (BSR), and loop control instruction (ACB) branch in spite of the value of the branch prediction bit being outputted from the branch prediction table. The data processor always correctly predicts that unconditional branch instruction BRA and subroutine branch instruction (BSR) branch.

By adding up the value designated as the loop control variable, ACB instruction identifies whether the result of the addition satisfies the loop terminating condition, or not. When it is not satisfied, branching is executed. When it is satisfied, then no branching is executed. As a result, in conjunction with the ACB instruction, this mechanism correctly predicts covering a majority of software with high probability. Programmers can prepare more efficient programs by fully utilizing characteristic features of the function of data processor related to the invention in dealing with ACB instruction than preparing programs without being aware of such advantageous features.

When processing Bcc instruction, the CPU identifies whether this instruction should be branched or not with reference to the past branch history. Review of the past branch history is executed by referring to address of the lower 8 bits of the address of the instruction executed immediately before the execution of Bcc instruction. Branch prediction is executed by referring to one time of the past branch history and the branch prediction is shown by one bit.

(4.4) "Configuration of Branch Prediction Table"

FIG. 6 represents the detail of instruction branch prediction table 113.

7 bits output from the PO bus 105 and 7 bits output from the OPC 139 are inputted to a decoder 152 via a selector 151. The decoder 152 decodes 7 bits into 128 bits, and then outputs one of these 128 bits of the branch history latch 153 to the branch prediction output latch 154 via a branch prediction signal line 161. On receipt of a clearance signal 157, all the 128 bits of the branch history latch 153 reset all values and designated that "no branching is executed". The branch prediction output latch 154 is connected to a branch prediction renewal circuit 156 with inverting the content by a branch prediction inversion circuit 155. The branch history latch 153 receives a branch prediction control signal 160 which is a write enable signal of the branch history latch 153. While this signal keeps "L", no data can be written into the branch history latch 153. A branch prediction signal 161 constitutes AND together with the branch prediction control signal 160 to deliver it to a branch prediction output latch 154. As a result, while the branch prediction control signal 160 keeps "L", it is constantly predicts that "no instruction will be branched".

Using the lower 8 bits of the address of instruction decoded by the D stage 32 immediately before the one decoded by the D stage 32 and in reference to the branch prediction table 113 mentioned above, the data processor related to the invention securely predicts the branching of specified instructions. By referring to the past one history, branch prediction is registered by direct mapping system. Since the least significant bit (shown to the right of FIG. 6) of the instruction address is constantly zero, the data processor related to the invention constitutes the branch prediction table using 128 bits.

Only when the Bcc instruction is decoded, branch prediction bit is effectively used. Independent of the needs for use, the branch prediction bit is inputted to the instruction decoder 111 together with instruction codes of all instructions. Reference to the branch prediction table 113 is executed by applying the lower 1 byte (where the least significant bit is unnecessary) of the PC value of the instruction immediately before the one outputted from the PC adder 132 when the instruction immediately before the above one is decoded. This allows the branch prediction bit to be inputted into the instruction decoder 111 before D stage 32 starts the following process.

Initial value of branch history of the branch prediction table 113 is totally changed as "no branching is executed" by applying the clearance signal 157. When the Bcc instruction branches at the E stage 35, branch prediction is renewed. In the case where the Bcc instruction branches at the stage 35, it means that branch prediction at the D stage 32 is incorrect. When this occurs, the E stage 35 renews branch prediction by inverting the incorrectly branch history at the E stage. The E stage 35 transfers the content of OPC 139 to the decoder 152. Using the decoded result of OPC 139, the content of the corresponding bit of the branch history latch 153 is read into the be branch prediction output latch 154. The branch prediction renewal latch 156 having the inverted content of the branch prediction output latch 154 is then rewritten into branch history latch 153 which is designated by the value of the OPC 139.

Since branch prediction is executed in accordance with the PC value of the instruction decoded immediately before Bcc instruction to be an object is decoded, renewal of the branch prediction table 113 is also executed in accordance with the PC value of the instruction executed by the E stage 35 immediately before executing the Bcc instruction. To achieve this, the E stage 35 is provided with the OPC 139 which stores the lower 1 byte (where the least significant bit is unnecessary) of the PC value of the instruction executed immediately before the instruction under processing. Using the lower 1 byte of the PC value mentioned above, the branch prediction table 113 is renewed. Branch history if renewed only when the Bcc instruction branches at the E stage 35, and thus, reference to branch prediction table 113 of the D stage 32 is not disturbed by the renewal of the branch history executed by the E stage 35. Immediately after the branching of instruction occurs in the E stage 35, the D stage 32 waits for the arrival of the instruction code from the IF stage 31. The branch history us rewritten while the D stage 32 waits for the arrival of the instruction code from the IF stage 31.

When no prediction is executed for branch instruction, the value of branch prediction control signal 160 keeps "L". The branch prediction signal 161 constituted AND together with branch prediction control signal 160, and then, is outputted to branch prediction output latch 154. This allows the mechanism to constantly predict that no branching will be executed. Since the branch prediction control signal 160 controls operation of the branch history latch 153 for writing the branch history, no branch history can be written into branch history latch 153.

(4.5) "Operation of PC Calculation Unit"

When an instruction code is decoded at the D stage 32, in reference to the data related to the length of instruction code decoded one time before and in reference to the head address of the instruction code decoded on time before, the PC calculation unit calculates the head address of instruction code being decoded. The PC calculation unit allows the DPC 135 to keep the PC value, i.e, the address of the boundary of the instructions, and allows the TPC 134 to control the address of the boundary of step code. The content of DPC 135 is rewritten only when the address of the boundary of the instruction is calculated. The content of TPC 134 is rewritten per every addresses at the boundary of step codes, i.e., whenever the instruction is decoded. Since the PC value of the step code processed by pipeline is needed for the PC value of the source instruction of the step codes, the PC value is transferred to DPC 135 and FPC 138.

As mentioned in paragraph (3.1.2), instruction is decoded per step code. Zero through six bytes of instruction codes are consumed per one decoding. The length of instruction code used when identifying each instruction decoding is outputted from the from the instruction decoder 111 to the instruction length bus 101.

When no pre-branching is executed, the D stage 32 decodes the following instruction, and simultaneously, in order to calculate the PC value of the following instruction at the PC calculation unit 53, D stage 32 adds the value of TPC 134 to the length of instruction code consumed for decoding after delivery from instruction length bus 101, and then writes the result of the addition into the TPC 134. Concretely, the head address of one step code is calculated when the step code is generated by decoding process.

Since instruction codes to be decoded are sequentially outputted from instruction queue 112 except for the time of pre-branching, there is no need of knowing the head address of the instruction codes at the beginning of decoding operation. When the step code generated by the D stage 32 is the last step code of instruction A, output from the PC calculator 132 calculated under decoding the following instruction B constitutes the head address of instruction B and also the PC value of instruction B, and as a result, PC value of instruction B as the output from the PC calculator 132 is written into the TPC 134 and DPC 135 via the PO bus 105. In the case where the A stage waits for an output code which is urgently required for the APC 136, the PC value of instruction B is also written into the APC 136 via the PO bus 105.

When executing pre-branching of instructions, after transmitting the last step code of the pre-branch instruction code, the D stage 32 stops operation of the instruction decoder 111 and calculates the PC value of branch target instruction by adding the value of the DPC 135 to the branch displacement transferred from the DISP bus 100. Then, the D stage 32 delivers initialization instruction to the IF stage 31, writes the PC value of the branch instruction as the result of the addition into the TPC 134 and DPC 135, and also writer the PC value of the branch instruction into the QINPC 115 and CAA 142 via the CA bus 104.

The D stage 32 detects the odd number address jump trap while calculating the branch target instruction address by pre-branching, and then designates the calculated result in the D code 41 as parameter. When it is judged that the pre-branching is correct, the E stage 35 activates the odd number address jump trap. When pre-branching is incorrect, and branching is executed at the E stage 35 again, odd number address jump trap is ignored. So the odd number address jump trap detected by the D stage 32 is processed independent of other EITs. To activate odd number address jump trap, the E stage 35 necessitates odd value of instruction address. To suffice this, when detecting odd number address jump trap, the D stage 32 generates a specific step code (OAJT step code) having PC value which is composed of an odd address value. The A stage 33 and F stage 34 transmit the OAJT step code to the following stages, respectively. When the CPU judges that the pre-branching is correct and when the odd number address jump trap is detected in the pre-branching, the E stage 35 then activates the odd number address jump trap by using the PC value of the next OAJT step code transferred through CPC 138.

When branching is executed at the E stage 35, branch target address is transferred from the EB 143 to the TPC 134 via the CA bus 104. The PC calculation unit 53 adds the value of branch target address to zero, and then writes the addup result into the TPC 134 and the DPC 135 via the PO bus 105. The initialization of PC calculation unit 53 is completed, where the initialization overlaps the initial unit decoding when branching occurs in the E stage 35. When delivering values to the TPC 134 from the CA bus 104, identical values are set to the QINPC 115 and CAA 142.

(4.6) "Operation of Operand Address Calculation Unit for Pre-Branch Instruction"

When the D stage 32 does not execute pre-branching for the pre-branch instruction, the operand address calculation unit 54 calculates branch target address of the pre-branch instruction. The address adder 124 calculates branch target address by adding the value of APC 136 transferred from the A bus 103 to the value of branch displacement delivered from the DISP bus 100. The calculated branch target address is delivered to the E stage 35. When the A stage 33 calculates branch target address using operand address calculation unit 54, detection of the odd number address jump trap is not executed. Since the branch target address transferred to the E stage 35 is an odd number, information of the odd number address jump trap is delivered to the E stage 35.

When the D stage 32 processes pre-branching, to deal with Bcc and ACB instructions, the A stage 33 calculates the PC value of the following instruction being present in the address following the pre-branched instruction. The calculation result is delivered to the E stage 35 so that the result is used again for the branch target address when the pre-branching is incorrect. To deal with those instructions like the Bcc instruction which should be decoded into one step code by the D stage 32, this stage 32 adds the instruction length of Bcc instruction delivered from the correction value bus 102 to the value of APC 136 transferred from the A bus 104, and then the result of the addition is written into the FA 127 via the AO bus 106.

For the ACB instruction which has a format where the step code is divided into two parts, the value of TPC 134 which is the head address of the last step code transmitted from the DISP bus 100 and the length of the instruction code used in decoding processing of the last step code transmitted from the correction value bus 102 are added, and the additional result is written into the FA 127 through the AO bus 106.

Although pre-branch is always correct as for the BSR instruction, the BSR instruction address is necessary as the return address. Therefore the address calculation is carried out in the operand address calculation unit 54.

Figure 32:
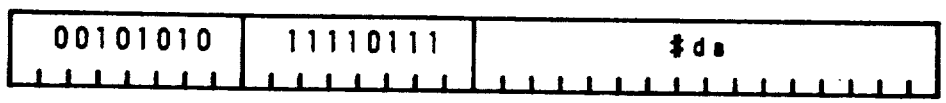
FIG. 32 is a schematic diagram showing a format of the BSR instruction.

The format of the BSR instruction is shown in FIG. 32 where #ds is the field to designate the branch displacement of BSR instruction by a 32-bit binary number. BSR instruction is an instruction decoded into a one-step code in the D stage 32, and similarly to the case of the Bcc instruction performs addition of the value of the APC 136 transferred from the A bus 103 and the instruction length of the BSR instruction transferred from the correction value bus 102. The procedure of calculating the return address for the BSR instruction is also used for a TRAP (unconditional trap) instruction and a TRAP/cccc (conditional trap) instruction.

The TRAPA instruction and the TRAP/cccc instruction are the instructions which are decoded into one-step codes at the D stage 32 too, and because these instructions have no addressing mode designated field, similarly to the case of the Bcc instruction, the operand address calculating unit 54 does not calculate the operand addresses of these instructions.

Figure 33:
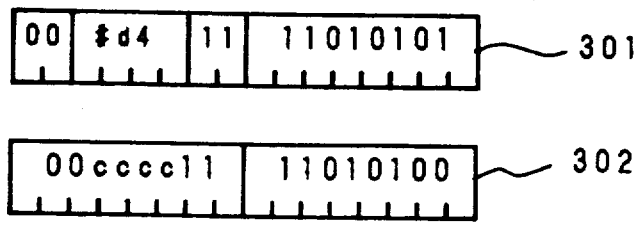
FIG. 33 is a schematic diagram showing a format of the TRAPA, TRAP/cccc instruction.

Formats of the TRAPA instruction and the TRAP/cccc instruction are shown in FIG. 33 where 301 designates the format of the TRAPA instruction and 302 indicates the format of the TRAP/cccc instruction. In FIG. 33, #d4 is the vector value designating field of the TRAPA instruction and cccc is the top condition designating field. In the TRAPA instruction and the TRAP/cccc instruction, instead of calculating the operand addresses, values of the APS 136 which are the PC values of these instructions and the instruction lengths of these instructions which are transferred from the correction value bus 102 are added.

(4.7) "Details of Method of Processing Each Branch Instruction"

Instructions for which the data processor of this invention performs pre-branching are summarized in the following.

(4.7.1) "BRA Instruction"

The BRA instruction is an unconditional branch instruction which causes branching whenever it is executed.

Because the BRA instruction inevitably causes branching, pre-branching processing is always performed at the D stage 32 by judging that branching must be done regardless of the branch prediction bit. In the A stage 33 and the F stage 34, the BRA instruction is transferred intact and only a flag which indicates whether the EIT has been detected or not and the PC value are transferred to the E stage 35 where no branching processing is made for the BRA instruction.

(4.7.2) "BSR Instruction"

The BSR instruction is a subroutine branch instruction which, when executed, always pushes the PC value of the instruction, which is stored in the address next to the BSR instruction, in the stack and causes a branching. The format of the BSR instruction is shown in FIG. 32.

Because the BSR instruction inevitably causes branching, pre-branch processing is always performed at the D stage 32 by judging that branching must be done independent of the branch prediction bit. In the A stage 33, a value of the APC 136 and the instruction length of the BSR instruction are added to calculate the return address from the subroutine which is transferred to the E stage 35 as the operand of the BSR instruction. In the E stage 35, the return address for the BSR instruction is pushed in the stack without performing branching processing.

(4.7.3) "Bcc Instruction"

Figure 34:
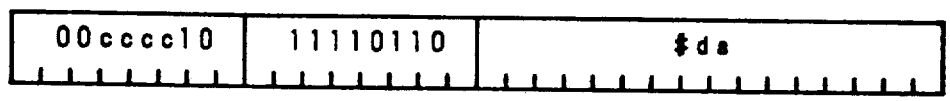
FIG. 34 is a schematic diagram showing a format of the Bcc instruction.

The Bcc instruction is a conditional branch instruction having an instruction format as shown in FIG. 34. The branch condition cccc has a 4-bit format. The branch condition cccc controls the branch condition in such a manner that the branch condition becomes opposite depending on whether the least significant bit of the branch condition cccc in FIG. 34 is "0" or "1". #ds is a field where the branch displacement is designated by a 32-bit binary number.

Because the probability of branching of the Bcc instruction considerably depends on the history of executions in the past, whether to branch or not is decided at the D stage 32 in accordance to the value of the branch prediction bit delivered from the branch prediction table 113. The dependence of the probability of branching of the Bcc instruction on the execution history is also described in detail in J. K. Lee, A. J. Smith "Branch Prediction Strategies and Branch Target Buffer Design", IEEE Computer, Vol. 17, No. 1, January, 1984.

When the branch prediction bit indicates "to branch", pre-branching processing is carried out at the D stage 32. When pre-branching is performed, the least significant bit of the branch condition cccc shown in FIG. 34 is inverted by the branch condition generating circuit 114 and the inverted bit is transferred to the E stage 35. Therefore the Bcc instruction can be executed in accordance to the given branch condition regardless of whether pre-branching processing was performed in the D stage 32 or not.

When the Bcc instruction has caused branching in the E stage 35, because it means that the branch prediction at the D stage 32 was wrong, the branch prediction table 113 is accessed and the branch prediction history of the address indicated by the OPC 139 is inverted.

Because the branch history is renewed only when the Bcc instruction causes a branching at the E stage 35, reference operation of the branch prediction table 113 by the D stage 32 never be affected by the renewal by the E stage 35. Immediately after a branching occurred in the E stage 35, the D stage 32 falls in a state of waiting for an instruction code to be sent from the IF stage 31. Rewriting of the branch history is carried out during the instruction code waiting state.

At the time of pre-branching of the Bcc instruction, when an odd number address jump trap has been detected and branching has not been caused at the E stage 35, an odd number address jump trap is started. Even when an odd number address jump trap has been detected at the time of pre-branching of Bcc instruction, detection of the odd number address jump trap at the time of pre-branching is ignored when a branching is caused at the E stage 35 again. This function eliminates the possibility of odd number address jump trap being detected during the execution of the Bcc instruction which does not perform branching processing.

(4.7.4) "ACB Instruction"

The ACB instruction is an instruction used as the primitive of a loop, and performs increasing of the loop control variable, comparing the values and conditional jumping.

Figure 35:
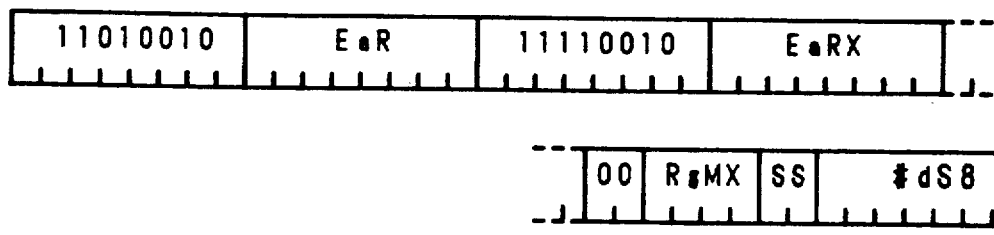
FIG. 35 is a schematic diagram showing a format of the ACB instruction.

The format of the ACB instruction is shown in FIG. 35, where EaR is a field to designate the value to be added to the loop control variable of a general type addressing mode, EaRX is a field to designate the reference of comparison for the loop control variable of a general type addressing mode, RgMX is a field to designate the No. of the general purpose register where the loop control variable is registered, and #ds8 is a field to designate the branch displacement in 8-bit binary number. The ACB instruction is a instruction which is divided into three or more step codes at the D stage 32 and flows through the pipeline.

Because the ACB instruction has a high probability of branching, the data processor of this invention performs pre-branching processing for this instruction, presuming that a branching will take place regardless of the value of the branch prediction bit.

Because this instruction is divided into three or more step codes (three when chained address addressing mode is not included), pre-branching processing is carried out when the D stage 32 delivers the last step code. In the D stage 32, the content of the DPC 135 which is the PC value of the ACB instruction and the branch displacement value delivered from the instruction decoder 111 through the DISP bus 100 are added to carry out the pre-branching control. In the A stage 33, in preparation for the case where the pre-branching processing has been incorrect, when calculating the PC value of the instruction in the address next to the ACB instruction, the head address of the instruction code used for the decoding of the last step code transferred from the TPC 134 through the DISP bus 100 and the instruction length of the instruction code which was used in decoding the last step code transferred though the correction value bus 102 are added.

Because pre-branching was always performed at the D stage 32 for this instruction, judgment of the branching condition is always done in a reverse manner at the E stage 35. In case pre-branching processing has been incorrect, branching takes place at the E stage 35. However, because this instruction does not perform pre-branching in accordance to the branch prediction table 113, the branch history is not rewritten even when the pre-branching was incorrect.

Also when an odd number address jump exception is detected at pre-branching for this instruction at the D stage 32, information on the detection is transferred to the E stage 35 by means of a parameter similarly to the case of the Bcc instruction. The odd number address jump trap sent to the E stage 35 is also not started when a branching takes place in the E stage 35 similarly to the case of the Bcc instruction, but is started when no branching is made. This function eliminates the possibility of odd number address jump trap being detected when the ACB instruction without branching processing is executed.

(5) "Another Embodiment of this Invention"

While two buses, the correction value bus 102 and the instruction length bus 101, are used to transfer the length of the instruction code used in instruction decoding from the instruction decoder 111 to the PC counter 53 or the operand address calculation unit 54, the instruction length bus 101 may be eliminated by, for example, providing an input route from the correction value bus 102 to the PC counter 53.

In the embodiment above described, the value of the TPC 134 is transferred through the DISP bus 102 to the operand address calculation unit 54 at the pre-branching processing for the ACB instruction, but the value of the TPC 134 may also be transferred through the A bus 103.

As described above, the odd number address jump trap is started only when the pre-branching processing for the Bcc instruction and the ACB instruction is correct, so that it is possible to prevent reducing of processing speed of the data processor caused by unnecessary starting of odd address jump trap, and there is no software load to ensure correct processing for the unnecessary odd address jump.

In addition, because branching processing in the data processor of the present invention is performed at the D stage 32 for the ACB instruction which is divided into multiple step codes as well as for the BRA instruction, BSR instruction and Bcc instruction which are processed with one step code, disturbances in the pipeline processing can be reduced for many branch instructions.

Figure 36:
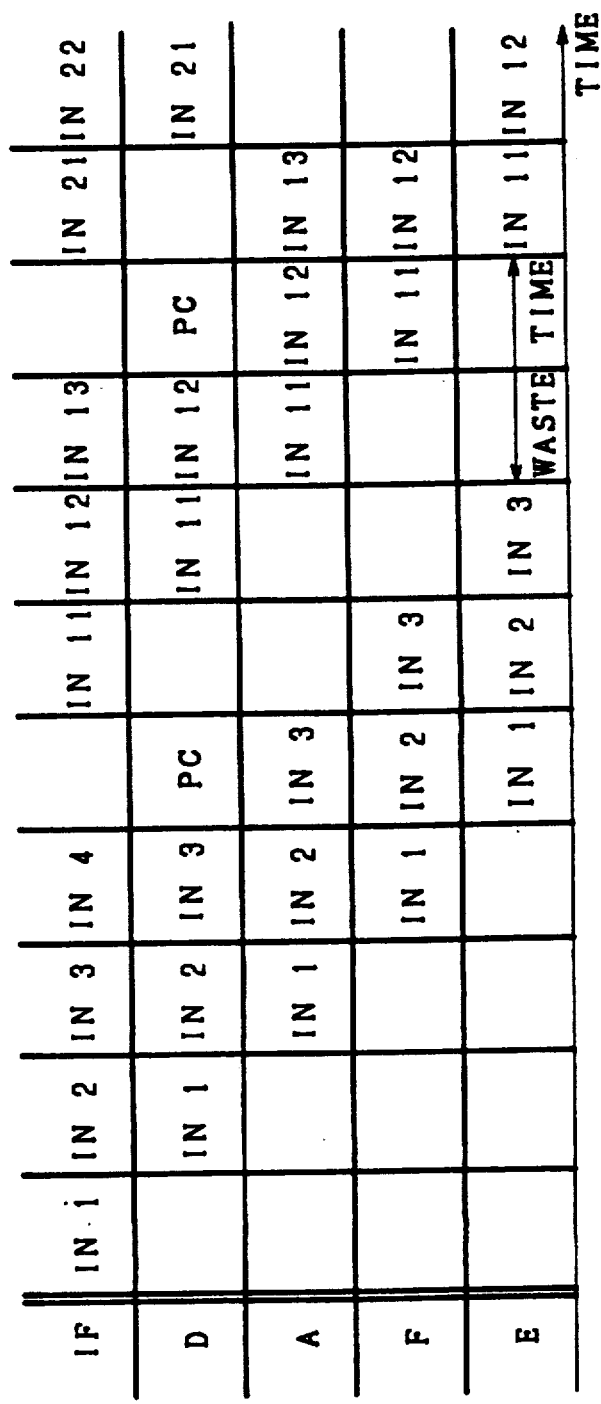
FIG. 36 is a schematic diagram showing processing flows of branch instructions, in a pipeline processing mechanism of the data processor of the present invention.

FIG. 36 shows that instructions flow through the pipeline when pre-branching instruction is executed in the data processor of this invention.

In FIG. 36, instruction IN3 and instruction IN12 are branch instructions which are objects by the prebranching processing of the data processor of this invention.

Figure 1:
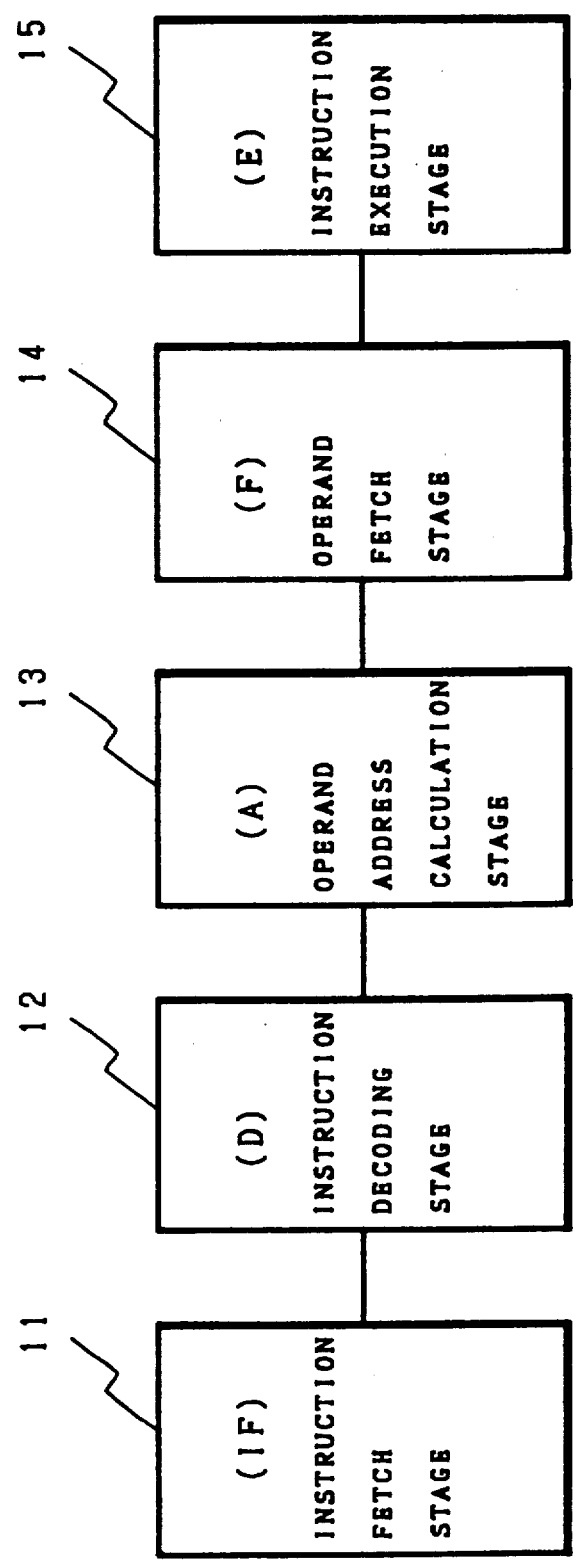
FIG. 1 is a block diagram showing a configuration of a pipeline processing mechanism in a conventional data processor.
Figure 2:
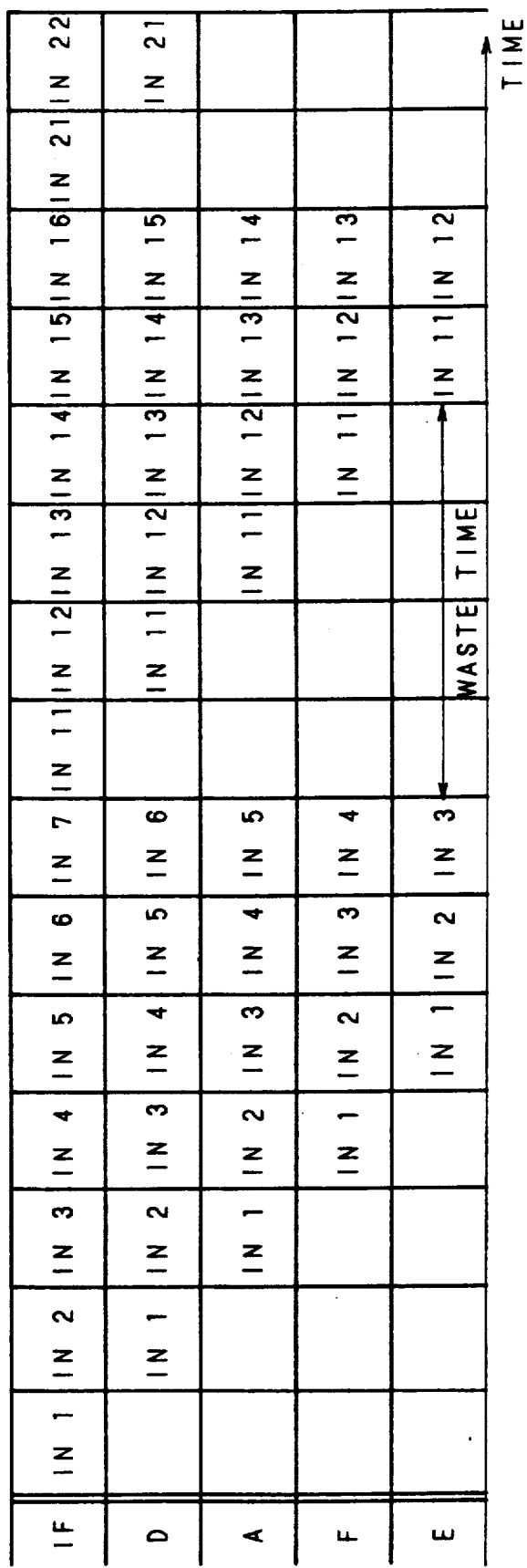
FIG. 2 is a schematic diagram showing a processing state of branch instructions by a pipeline processing mechanism of a conventional data processor.

When instruction IN3 is decoded at the D stage 32 and it is judged to perform pre-branching, then the PC value of the branch target instruction is calculated in the PC calculation unit 53 at the D stage 32. The the branch target instruction is fetched by the IF stage 31, and the object of pipeline processing is switched to instruction IN3 in the early timing, and canceling the processing of instruction IN4. Even when pre-branching is being carried out at the D stage 32 and IF stage 31, processing of preceding instructions IN1 and IN2 is continued. Consequently, the instruction IN11 is processed at the E stage 35 after processing of two instructions from the time when the instruction IN3 has been processed at the E stage 35. This means that, as shown in FIG. 2, the data processor of the present invention reduces the waste time to half of that in the case of the conventional data processors which do not perform pre-branching processing where a period of time equivalent to processing of four instructions has been consumed as waste time.

As shown above, pre-branching is very effective in increasing the processing speed of a data processor, and it is important to carry out pre-branching control for as many branching instructions as possible. In the present invention, it is made possible to carry out pre-branching control for as many branch instructions as possible.

In the present invention, it is made possible to carry out pre-branching control for the ACB instruction which is divided into multiple step codes as well as for the BRA instruction and the Bcc instruction which are processed with one step code, enabling to obtain a data processor of greatly increased processing speed by adding a little hardware to the PC calculation unit 53 and the operand address calculation unit 54.

Also it is made possible to carry out rewriting of the branch prediction table before it becomes necessary to access to the branch prediction table 113 at the D stage 32, when a branching is performed for the Bcc instruction at the E stage 35, and it is enabled to prevent the processing speed of the data processor from decreasing due to the stagnation of the pipeline processing caused by the competition to access the branch prediction table 113 between the D stage 32 and the E stage 35.

This invention further improves the pipeline processing efficiency for the BSR instruction by performing pre-branching for the BSR instruction or, if no pre-branching is performed, calculating the address of the instruction at the return target instruction from the branch target routine which has been processed after branching by the BSR instruction, in the operand address calculation unit 54 which is to calculate the branching target address. The function of the operand address calculation unit 54 to calculate the address of the return target instruction from subroutine is also used for general purposes so that, for the TRAPA instruction for example, the PC value of the instruction stored two addresses from the TRAPA instruction is calculated to reduce the execution time for the instruction at the E stage 35, thereby obtaining a data processor of improved pipeline processing efficiency.

As this invention may be embodied in several forms without departing from the spirit of essential characteristics thereof, the present embodiment is there fore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A data processor having a pipeline processing mechanism for processing instructions, including a conditional branch instruction which is an instruction to branch to a target instruction provided a branch condition is fulfilled, comprising:

an address calculation stage a first pipeline stage which has means for decoding said conditional branch instruction, a branch prediction mechanism, means for judging whether pre-branching is executed or not corresponding to indication of said branch prediction mechanism, means for detecting an exception generated at pre-branching, and means for outputting a code to the address calculation stage a second pipeline stage coupled to receive information from said first pipeline stage which has means for judging whether branching is excused or not corresponding to the branch condition of said conditional branch instruction, and activatable means for starting exception processing with respect to said exception, and means, coupled to said first and second pipeline stages, for transmitting an indication that said exception is detected from said first pipeline stage to said second pipeline stage, wherein, when said indication is transmitted to said second pipeline stage, and after said pre-branching is executed said second pipeline stage activates said activatable means for starting exception processing when "execution" of said branch instruction causes branching to said target instruction and does not activate said activatable means for starting exception processing when said execution of said branch instruction does not cause branching to said target instruction.

2. The data processor, as claimed in claim 1, wherein said exception generated at pre-branching is an odd-address-jump exception.

3. The data processor, as claimed in claim 1, wherein said first pipeline stage is an instruction decode stage.

4. The data processor, as claimed in claim 1, wherein said second pipeline stage is an instruction execution stage.

5. The data processor, as claimed in claim 1, wherein: said means for transmitting includes means for storing a parameter in said code.

6. The data processor, as claimed in claim 1, wherein said second pipeline stage activates said activatable means for starting exception processing only if said branch prediction mechanism judges that pre-branching is executed.

* * * * *